(12) United States Patent
Akiyama et al.

(10) Patent No.: US 12,434,342 B2
(45) Date of Patent: Oct. 7, 2025

(54) PROCESSING MACHINE, PROCESSING SYSTEM, AND METHOD FOR MANUFACTURING PROCESSED OBJECT

(71) Applicant: SHIBAURA MACHINE CO., LTD., Tokyo (JP)

(72) Inventors: Takanobu Akiyama, Shizuoka (JP); Masahiko Fukuta, Shizuoka (JP); Katsuji Gakuhari, Shizuoka (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 356 days.

(21) Appl. No.: 18/006,812

(22) PCT Filed: Jul. 21, 2021

(86) PCT No.: PCT/JP2021/027295
§ 371 (c)(1),
(2) Date: Jan. 25, 2023

(87) PCT Pub. No.: WO2022/024916
PCT Pub. Date: Feb. 3, 2022

(65) Prior Publication Data
US 2023/0339060 A1     Oct. 26, 2023

(30) Foreign Application Priority Data
Jul. 28, 2020    (JP) ................. 2020-127195

(51) Int. Cl.
*B23Q 15/12*     (2006.01)
*B23Q 17/22*     (2006.01)
*G05B 19/404*    (2006.01)

(52) U.S. Cl.
CPC .............. *B23Q 15/12* (2013.01); *B23Q 17/22* (2013.01); *G05B 19/404* (2013.01)

(58) Field of Classification Search
None
See application file for complete search history.

(56) References Cited

U.S. PATENT DOCUMENTS

| 2009/0292503 A1 | 11/2009 | Hon et al. |
| 2012/0253506 A1 | 10/2012 | Matsushita |

(Continued)

FOREIGN PATENT DOCUMENTS

| CN | 104698966 A | 6/2015 |
| CN | 104699118 A | 6/2015 |

(Continued)

OTHER PUBLICATIONS

Japanese Office Action in Application No. 2020-127195, dated Mar. 19, 2024.

(Continued)

*Primary Examiner* — Ryan A Jarrett
(74) *Attorney, Agent, or Firm* — DLA Piper LLP (US)

(57) ABSTRACT

In a processing machine 1, an X-axis control unit 33X, in each control cycle Tc, controls the position of an X-axis table 9X in the X-direction by feedback. The Z-axis control unit 33Z, in each control cycle Tc, acquires an up-close detection value of the position of the Z-axis table 9Z in the Z-direction, computes a second deviation based on a difference between the acquired detection value and a target position, and controls a Z-axis drive source 23z so that the second deviation is reduced. The Z-axis control unit 33Z, in each control cycle Tc, acquires an up-close detection value of a first error comprised of a deviation of the X-axis table 9 in the Z-direction, and increases or reduces the second deviation based on the detection value of the first error so that at least a portion of an error in a relative position of a (Continued)

workpiece 103 and a tool 101 in the Z-direction originating from the first error is cancelled by movement of the Z-axis table 9Z in the Z-direction.

11 Claims, 10 Drawing Sheets

(56) References Cited

U.S. PATENT DOCUMENTS

| | | | |
|---|---|---|---|
| 2015/0128773 A1* | 5/2015 | Schneider | B24B 41/02 82/123 |
| 2015/0153742 A1 | 6/2015 | Ko et al. | |
| 2015/0160049 A1 | 6/2015 | Oki | |
| 2017/0308055 A1 | 10/2017 | Hoshino et al. | |
| 2018/0246492 A1 | 8/2018 | Ido et al. | |

FOREIGN PATENT DOCUMENTS

| | | |
|---|---|---|
| DE | 102012205423 A1 | 10/2012 |
| JP | S46-004447 | 11/1971 |
| JP | 62-055706 | 3/1987 |
| JP | 04-111003 | 4/1992 |
| JP | H04240044 A | 8/1992 |
| JP | H08197378 A | 8/1996 |
| JP | 2539097 | 10/1996 |
| JP | 09-076141 | 3/1997 |
| JP | 10-315082 | 12/1998 |
| JP | 2005-128914 | 5/2005 |
| JP | 2007-086953 | 4/2007 |
| JP | 2007-226836 | 9/2007 |
| JP | 4111003 B2 | 7/2008 |
| JP | 2009279722 A | 12/2009 |
| JP | 2011-240457 | 12/2011 |
| JP | 2015-109023 | 6/2015 |
| JP | 2015-109079 | 6/2015 |
| JP | 2017054403 A | 3/2017 |
| JP | 6255706 B2 | 1/2018 |
| JP | 6351745 B2 | 7/2018 |

OTHER PUBLICATIONS

Toru Fujimori, "Research on linear scale system for high-precision motion control of NC machine tools", Dissertation Ph.D., Keio Univ. Graduate School of Science and Enginerring, 2014, pp. 43.46.
Office Action for German Patent Application No. 112021004058.8, dated Apr. 3, 2025, 9 pages.
Office Action for Korean Patent Application No. 10-2023-7003206, mailed Jun. 20, 2025, 19 pages.
Office Action for Chinese Patent Application No. 202180061352.6, mailed Jul. 21, 2025, 20 pages.

* cited by examiner

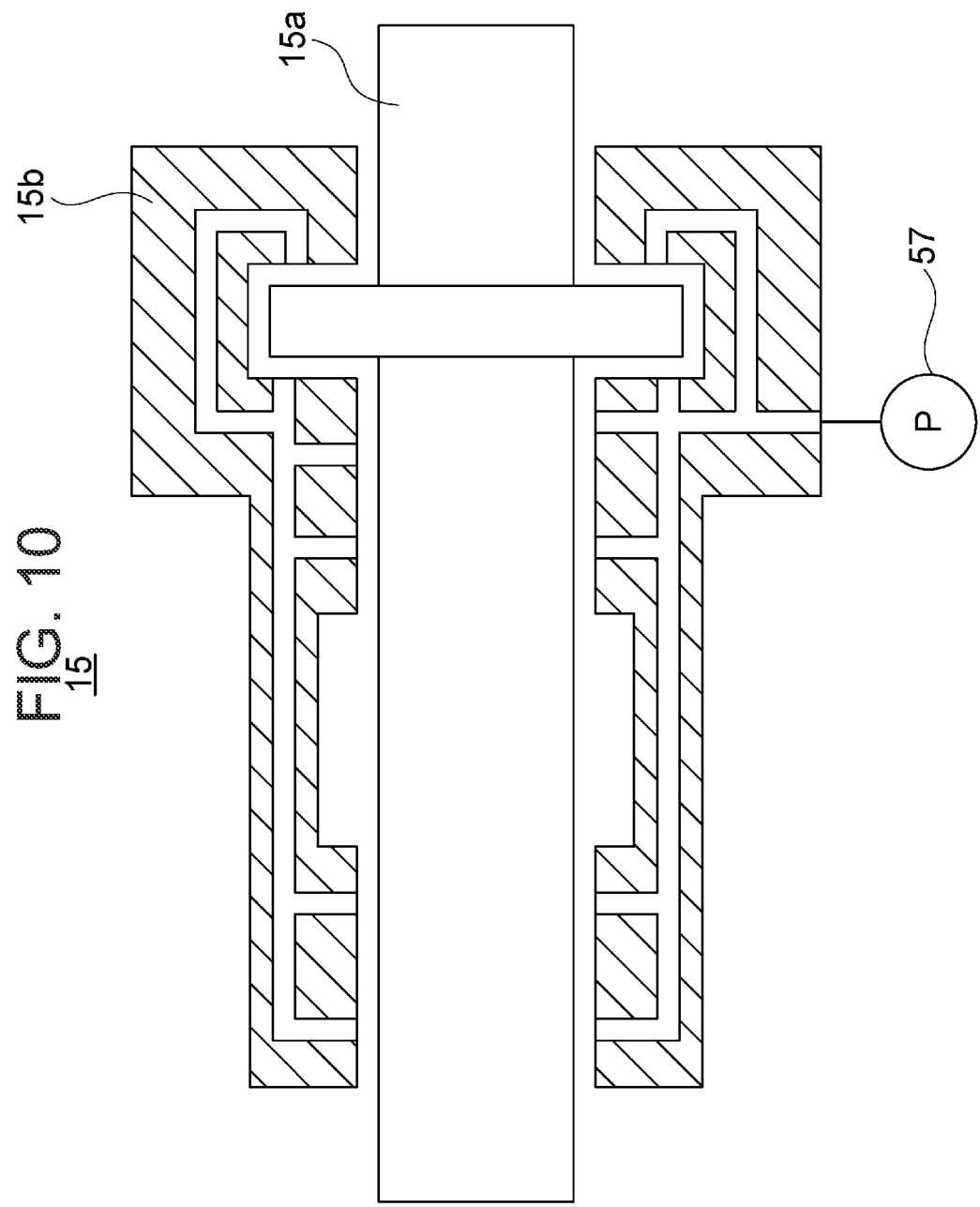

US 12,434,342 B2

PROCESSING MACHINE, PROCESSING SYSTEM, AND METHOD FOR MANUFACTURING PROCESSED OBJECT

CROSS REFERENCE TO RELATED APPLICATIONS

This application is a U.S. National Stage Application of International Application No. PCT/JP2021/027295 filed Jul. 21, 2021, which claims priority from Japan Patent Application No. 2020-127195 filed Jul. 28, 2020. The entirety of all the above-listed applications are incorporated herein by reference.

TECHNICAL FIELD

The present disclosure relates to a processing machine, a processing system, and a method for manufacturing a processed object.

BACKGROUND ART

Known are processing machines which process a workpiece with a tool (for example, PTLs 1 to 3). A processing machine, for example, comprises a moving part (for example, a table or a head) which holds a tool or workpiece and is driven in a predetermined direction in order to move the tool and workpiece relative to each other. The moving part, for example, is guided by guides and ideally moves on a straight line. However, these parts actually move in a wavy manner due to manufacturing error etc. in the guides. That is, the straightness or perpendicularity variance will not be zero. Such waviness reduces the precision of processing.

PTL 1 discloses the art of registering perpendicularity variance relating to movement of a table in advance in a numerical control (NC) device, using that perpendicularity variance to correct a target position, and making the table move to it to thereby reduce the perpendicularity variance.

PTL 2 discloses the art of detecting a path of movement of a processing machine when making it move according to an NC program and correcting the NC program based on the detected movement path and an ideal movement path.

PTL 3 discloses a processing machine comprising a first table for holding a workpiece, a second table which moves in a direction orthogonal to the movement direction of the first table, and a fine movement stage which is provided on the second table and holds a tool. This processing machine detects the straightness variance of the first table in real time and drives the fine movement stage so that the influence of the detected straightness variance on processing error is reduced.

CITATION LIST

Patent Literature

PTL 1: Japanese Patent Publication No. 62-55706
PTL 2: Japanese Patent Publication No. 4-111003
PTL 3: Japanese Patent Publication No. 9-76141

SUMMARY OF INVENTION

Technical Problem

The arts in PTLs 1 and 2 are methods measuring straightness variance in advance, so they cannot be applied to, for example, non-reproducible straightness variance or straightness variance with reproducibility that is limited to short durations. As a result, they are not suited to, for example, ultra-precise processing which demands precision in the order of tens of nanometers or less. The art in PTL 3, for example, requires a fine movement stage to reduce straightness variance, leading to larger and/or more complicated processing machines.

A processing machine, processing system, and method for manufacturing a processed object which are capable of reducing processing error originating from straightness variance are being awaited.

Solution to Problem

A processing machine according to one aspect of the present disclosure comprises a first moving part, a first guide, a first drive source, a first sensor, a second moving part, a second guide, a second drive source, a second sensor, and a control device. The first moving part can support a workpiece or tool. The first guide guides the first moving part in a first direction. The first drive source drives the first moving part in the first direction. The first sensor outputs a signal corresponding to a first displacement comprised of a displacement of the first moving part in the first direction and a first error comprised of a displacement of the first moving part in a second direction orthogonal to the first direction. The second moving part can support the workpiece or the tool. The second guide guides the second moving part in the second direction. The second drive source drives the second moving part in the second direction. The second sensor outputs a signal corresponding to a second displacement comprised of a displacement of the second moving part in the second direction. The control device controls the first drive source and the second drive source according to a program which includes information about instructions relating to movement of the first moving part and the second moving part. The control device comprises an interpolation unit, a first control unit, and a second control unit. The interpolation unit, based on the information from the program, computes a first target position for the first moving part in the first direction in each predetermined control cycle and a second target position for the second moving part in the second direction in each predetermined control cycle. The first control unit, in each control cycle, acquires an up-close detection value of the first displacement based on the signal from the first sensor, computes a first deviation based on a difference between the acquired detection value and the first target position, and controls the first drive source so that the first deviation is reduced. The second control unit in each control cycle acquires an up-close detection value of the second displacement based on the signal from the second sensor, computes a second deviation based on a difference between the acquired detection value and the second target position, and controls the second drive source so that the second deviation is reduced. Further, the second control unit, in each control cycle, acquires an up-close detection value of the first error based on the signal from the first sensor and increases or reduces the second deviation based on the detection value of the first error so that at least a portion of an error in a relative position of the workpiece and the tool in the second direction originating from the first error is cancelled by movement of the second moving part in the second direction.

A processing system according to one aspect of the present disclosure comprises the above processing machine and a diagnostics device acquiring information about the detection value of the first error from the processing machine and displaying an image corresponding to the acquired information.

A method for manufacturing a processed object according to one aspect of the present disclosure comprises a step of using the above processing machine to place the workpiece and the tool in contact with each other to process the workpiece into the processed object.

Advantageous Effects of Invention

According to the above configurations or procedure, it is possible to reduce processing error originating from straightness variance.

BRIEF DESCRIPTION OF DRAWINGS

FIG. 10 is a view of a cross-section showing one example of the configuration of a bearing of a spindle of the processing machine in FIG. 1.

DESCRIPTION OF EMBODIMENTS (Overall Configuration of Processing Machine)

Figure 1:
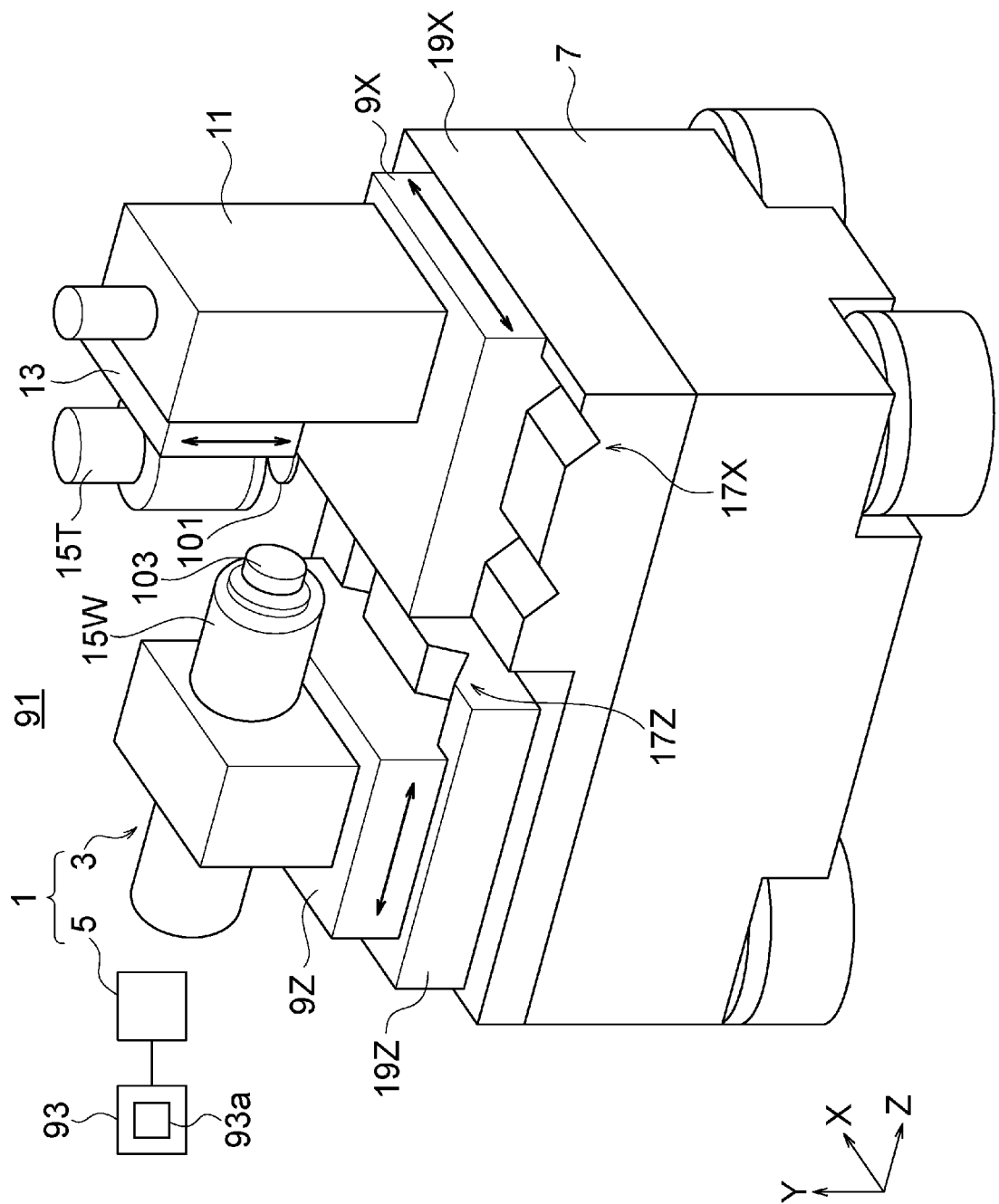
FIG. 1 is a schematic perspective view showing the configuration of a processing machine according to an embodiment.

FIG. 1 is a schematic perspective view showing the configuration of a processing machine 1 according to an embodiment. For convenience, the X-, Y-, and Z-directions of an orthogonal coordinate system have been added to the drawing. The +Y-direction, for example, is vertically upwards.

The art according to the present disclosure can be applied to various processing machines. The processing machine 1 shown in the drawing is only one such example. For convenience, however, the following explanations will at times assume the configuration of the processing machine 1.

The processing machine 1, for example, uses a tool 101 to grind and/or polish a workpiece 103. To provide a more detailed explanation, the workpiece 103 in the illustrated example rotates about an axis parallel to the Z-direction. Further, the tool 101 is configured by a grinding wheel and rotates about an axis parallel to the Y-direction. In addition, the tool 101 grinds and/or polishes the workpiece 103 by being made to abut against the workpiece 103. Such a processing machine, for example, can be used as an aspheric surface processing machine for fabricating aspheric lenses etc.

The processing machine 1, for example, comprises a machine body 3 for holding the tool 101 and a workpiece 103 and a control device 5 for controlling the machine body 3.

The machine body 3, for example, rotates the workpiece 103 and the tool 101 as described above and moves the tool 101 and the workpiece 103 relative to each other so as to approach each other or separate from each other. The relative orientation of the axis of rotation of the workpiece 103 and the axis of rotation of the tool 101 to each other, the orientation of each axis of rotation in an absolute coordinate system, the direction of the relative movement between the tool 101 and workpiece 103, the presence or absence of movement of the tool 101 and the workpiece 103 in the absolute coordinate system, the direction of that movement, etc. may be suitably set.

In the illustrated example, the tool 101 before grinding is positioned by being moved in the Y-direction. During grinding, as already described, the workpiece 103 is rotated about an axis parallel to the Z-direction, and the tool 101 is rotated about an axis parallel to the Y-axis. Further, the tool 101 and the workpiece 103 are moved relative to each other in the Z-direction and X-direction. To provide a more detailed explanation, the tool 101 moves in the X-direction in an absolute coordinate system, and the workpiece 103 moves in the Z-direction in the absolute coordinate system. Through such actions, the workpiece 103 is grinded and/or polished on the +Z-side surface and/or outer peripheral surface around an axis parallel to the Z-axis.

The configuration that would realize such rotational and translational movement, for example, may be made one similar to various known configurations or may be made one based on a known configuration. In the illustrated example, the configuration is as follows.

The machine body 3 comprises a base 7, an X-axis table 9X supported on the base 7, a column 11 fixed to the X-axis table 9X, a saddle 13 supported on the column 11, and a tool spindle 15T supported on the saddle 13. The tool spindle 15T holds the tool 101 and can rotate the tool 101 about an axis parallel to the Y-direction. The X-axis table 9X can move linearly on the base 7 in the X-direction. Due to this, the tool 101 is driven in the X-direction. The saddle 13 can move linearly in the Y-direction relative to the column 11. Due to this, the tool 101 is driven in the Y-direction.

Further, the machine body 3 comprises a Z-axis table 9Z supported on the base 7 and a workpiece spindle 15W supported on the Z-axis table 9Z. The workpiece spindle 15W holds the workpiece 103 and can rotate the workpiece 103 about an axis parallel to the Z-direction. The Z-axis table 9Z can linearly move on the base 7 in the Z-direction. Due to this, the workpiece 103 is driven in the Z-direction.

Note that, in the explanations below, the X-axis table 9X and Z-axis table 9Z are at times not differentiated but are collectively referred to as the "tables 9". Further, the tool spindle 15T and workpiece spindle 15W are at times not differentiated but are collectively referred to as the "spindles 15".

The configuration of the mechanism for realizing movement of the tables 9, movement of the saddle 13, and rotation of the spindles 15 may be a known configuration or may be based on a known configuration. For example, each drive source may be an electric motor, hydraulic device, or pneumatic device. Further, the electric motor may be a rotating electric motor or linear motor. A linear guide for guiding the tables 9 or saddle 13 (from another point of view, for restricting movement in directions other than the driving direction) may be a slide guide on which the moving part and the fixed part slide, a rolling guide in which rolling elements roll between the moving part and the fixed part, a hydrostatic guide in which air or oil is interposed between the moving part and fixed part, or a combination of two or more of these. Similarly, the bearing of each spindle 15 may be a slide bearing, a rolling bearing, a hydrostatic bearing, or a combination of two or more of these.

The control device 5, for example, while not illustrated in particular, is configured so as to include an NC device and a driver (for example, a servo driver). The NC device, for example, while not illustrated in particular, is configured so as to include a CPU (central processing unit), a ROM (read only memory), a RAM (random access memory), and an external storage device. In other words, the NC device is configured so as to include a computer. The CPU executes programs stored in the ROM and/or external storage device to construct various functional units for performing control etc. Further, the NC device may include a logic circuit for solely performing a certain operation.

The control device 5, for example, controls the rotational speed of the spindles 15 (from another point of view, the not illustrated spindle motors) and the speeds and positions of the tables 9 and saddle 13. The position control may be performed through so-called full-closed loop control. That is, the detection positions of the tables 9 and the saddle 13 may be fed back. The speed control for the tables 9 and the saddle 13 may be performed through full-closed loop control like the position control. However, the speed control may be performed through open-loop control with no feedback or semi-closed loop control in which the detection value for the electric motor rotational speed is fed back.

The processing precision of the processing machine 1 may be suitably set. For example, the processing machine 1 may be one in which processing with a precision on the order of sub-micrometers (error less than 1 µm) or nanometers (error less than 10 nm) is realized. Such a machine tool has already been put to practical application by the present applicant (for example, UVM series, ULG series, and ULC series). To provide a more detailed explanation, for example, the positioning precision of the X-axis table 9X in the X-direction, the positioning precision of the Z-axis table 9Z in the Z-direction, and/or the positioning precision of the saddle 13 in the Y-direction may be 1 µm or less, 0.1 µm or less, 10 nm or less, or 1 nm or less.

(One Example of Movement Mechanism)

As already described, the configuration for moving the tables 9 on a straight line may be suitably set. One example is shown below.

Figure 2A:
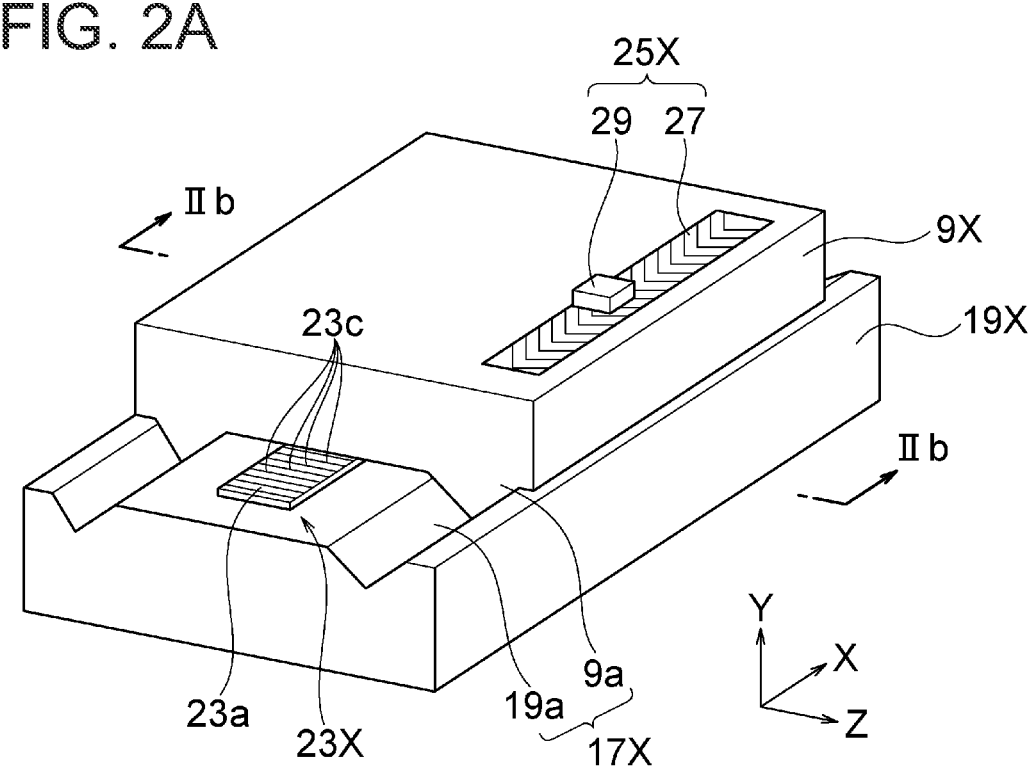
FIG. 2A is a perspective view showing one example of a configuration in which the X-axis table of the processing machine in FIG. 1 is moved linearly.
Figure 2B:
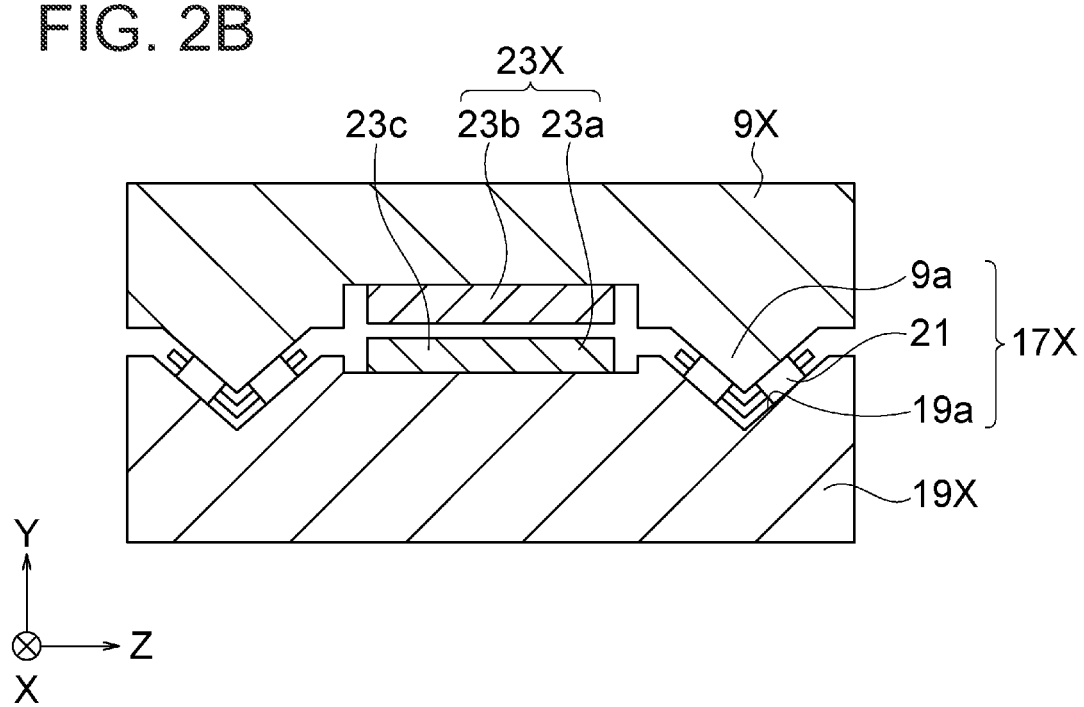
FIG. 2B is a view of a cross-section taken along the II-II line in FIG. 2A.

FIG. 2A is a perspective view showing one example of a configuration in which the X-axis table 9X is moved linearly, and FIG. 2B is a view of a cross-section taken along the II-II line in FIG. 2A.

In the illustrated example, an X-axis guide 17X for guiding the X-axis table 9X is configured by a V-V rolling guide. For example, the X-axis guide 17X comprises two grooves 19a with V-shaped cross sections and formed on the upper surface of an X-axis bed 19X for supporting the X-axis table 9X, two ridges 9a with triangular cross-sections and formed on the lower surface of the X-axis table 9X, and a plurality of rollers 21 (rolling elements) interposed between the grooves 19a and the ridges 9a. The grooves 19a and the ridges 9a extend linearly in the X-direction, and the ridges 9a mate with the grooves 19a across the rollers 21. This restricts movement of the X-axis table 9X in the Z-direction. Further, the rollers 21 roll against the inner surface of the grooves 19a and the outer surface of the ridges 9a, and relative movement of both in the X-direction is allowed. Due to this, the X-axis table 9X moves in the X-direction with comparatively lower resistance. Movement of the X-axis table 9X to the +Y-side, for example, is restricted by its weight. Movement of the X-axis table 9X to −Y-side, for example, is restricted by reaction force from the X-axis bed 19X.

Further, in the illustrated example, the X-axis drive source 21X for driving the X-axis table 9X is configured by a linear motor. For example, the X-axis drive source 21X comprises a magnet array 21a comprising a plurality of magnets 21c arranged on the upper surface of the X-axis bed 19X in the X-direction and a coil 21b fixed to the lower surface of the X-axis table 9X and facing the magnet array 21a. Further, by supplying alternating current power to the coil 21b, the magnet array 21a and coil 21b produce a driving force in the X-direction. In turn, the X-axis table 9X moves in the X-direction.

Although a configuration for linearly moving the X-axis table 9X was described, as can be understood from FIG. 1, X and Z are interchangeable in the above explanation for application to a configuration for linearly moving the Z-axis table 9Z. That is, the Z-axis guide 17Z may be a V-V rolling guide comprising grooves 19a on a Z-axis bed 19Z, ridges 9a on the Z-axis table 9Z, and rollers 21 interposed in between. The Z-axis drive source 23Z (FIG. 4) of the Z-axis guide 17Z may be configured by a linear motor.

(Method for Reducing Processing Error Originating from Straightness Variance)

The X-axis table 9X ideally moves linearly in the X-direction. However, it will actually move in a wavy manner (with displacement in a direction orthogonal to the X-direction) due to various reasons. That is, the tool 101 will suffer from positioning error in a direction orthogonal to the X-direction. This error will occur at a magnitude of, for example, 10 nm to 1 µm even if the guide 17 that is used has a high straightness. Accordingly, in, for example, a processing machine 1 in which high processing precision (for example, error of 1 µm or less or 0.1 µm or less) such as in ultra-precise processing machines, positioning error has a large influence.

Therefore, in the present embodiment, the displacement (error) of the X-axis table 9X in the Z-direction is detected in real time. For example, the error of the X-axis table 9X (from another point of view, the tool 101) in the Z-direction in a predetermined period during movement of the X-axis table 9X in the X-direction (from another point of view, during processing, for example) is detected. In addition, the Z-axis table 9Z (from another point of view, the workpiece 103) is moved in the Z-direction to cancel the error (some or all) in the relative positions of the tool 101 and the workpiece 103 originating from that error. For example, in the illustrated example, if the X-axis table 9X suffers from an error at the +Z-side, the Z-axis table 9Z moves to the +Z side with a movement amount of a magnitude equivalent to the error. To provide a more detailed explanation, a movement amount corresponding to the above error is added to the normal movement amount of the Z-axis table 9Z in the Z-direction (movement amount restricted by the NC program). This can reduce the influence of straightness variance in the movement of the X-axis table 9X on processing error.

Although the error of the X-axis table 9X in the Z-direction was used as an example, the above method for reducing processing error can also be applied to the error of the X-axis table 9X in the Y-direction and also can be applied to the Z-axis table 9Z and the saddle 13. However, the explanation of the present embodiment will mainly use the error of the X-axis table 9X in the Z-direction and the error of the Z-axis table 9Z in the X-direction as examples.

Below, an example of the configuration for realizing the above method for reducing processing error will be explained.

(Sensor)

As shown in FIG. 2A, the processing machine 1 comprises an X-axis sensor 25X for detecting the positions of the X-axis table 9X in the X-direction and in the Z-direction. As can be understood from the explanations up to now, the position in the X-direction detected by the X-axis sensor 25X is used in full-closed loop control for the position of the X-axis table 9X in the X-direction. Further, the position in the Z-direction detected by the X-axis sensor 25X is used in control for the position of the Z-axis table 9Z in the Z-direction.

In FIG. 2A, a two-dimensional scale (in other words, a two-dimensional encoder) is provided as an example of the X-axis sensor 25X. The two-dimensional scale, for example, comprises a scale part 27 extending in the X-direction and a detection unit 29 facing the scale part 27. The scale part 27, for example, is configured by a plurality of patterns formed optically or magnetically arranged at a certain pitch in the X-direction (depending on the configuration of the X-axis sensor 25X, this will be the Z-direction in addition to the X-direction). The detection unit 29 generates a signal corresponding to the relative position with each of the patterns. Accordingly, displacement (position) can be detected from the count of signals generated along with relative movement of the scale part 27 and detection unit 29 (that is, the count of patterns).

One of the scale part 27 and the detection unit 29 (in the illustrated example, the scale part 27) is fixed to the X-axis table 9X. The other of the scale part 27 and the detection unit 29 (in the illustrated example, the detection unit 29) is directly or indirectly fixed to the X-axis bed 19X. Accordingly, when the X-axis table 9X moves, the scale part 27 and the detection unit 29 move relative to each other. Due to this, the displacement (position) of the X-axis table 9X is detected.

The specific attachment positions of the scale part 27 and detection unit 29 may be suitably set. Further, the X-axis sensor 25X may be an absolute sensor which can determine the position of the detection unit 29 on the scale part 27 (the absolute position) based on the patterns of the scale part 27 or may be an incremental sensor which cannot make such determinations. As is known, the absolute position can be determined even with an incremental scale by the calibration in which the detection unit 29 is moved to a predetermined position (for example, a movement limit) on the scale part 27.

The error in the movement of the X-axis table 9X (displacement in the Z-direction) is, as a matter of course, relatively smaller than the movable length of the X-axis table 9X in the X-direction. Accordingly, the length of the range of the X-axis sensor 25X over which the position in the Z-direction can be detected may be shorter than the length of the range over which the position in the X-direction can be detected. For example, the latter may be 10 times or more or 100 times or more than that of the former. Further, the length of the range over which the position in the Z-direction can be detected may be, for example, 1 cm or less, 1 mm or less, 10 μm or less, or 1 μm or less. Note that the range over which the position in the X-direction can be detected may be, for example, 1 cm or more, 5 cm or more, 10 cm or more, or 30 cm or more on the assumption that it is longer than the length of the range over which the position in the Z-direction can be detected. Note that in the above explanation, the length of the range over which the position in the X-direction can be detected and the length of the range over which the position in the Z-direction can be detected may be substituted with the lengths of the X-axis sensor 25X (in more detail, the scale part 27, for example) in the X-direction and in the Z-direction.

In the X-axis sensor 25X, the detection precision for the position in the X-direction and the detection precision for the position in the Z-direction may be equivalent to each other or may be different from each other. In either case, in the X-axis sensor 25X, the detection precision for the position in the X-direction and the detection precision for the position in the Z-direction may be relatively high, for example, 1 μm or less, 0.1 μm or less, 10 nm or less, or 1 nm or less.

Although an X-axis sensor 25X for detecting the position of the X-axis table 9X was described, X and Z may be interchanged in the above explanation for application to a Z-axis sensor 25Z (FIG. 4) for detecting the Z-axis table 9Z.

(One Example of Two-Dimensional Scale)

The configuration of the two-dimensional scale may be made various configurations including known configurations. Below, one example is shown. For convenience, the following explanation will use the X-axis sensor 25X as an example.

Figure 3A:
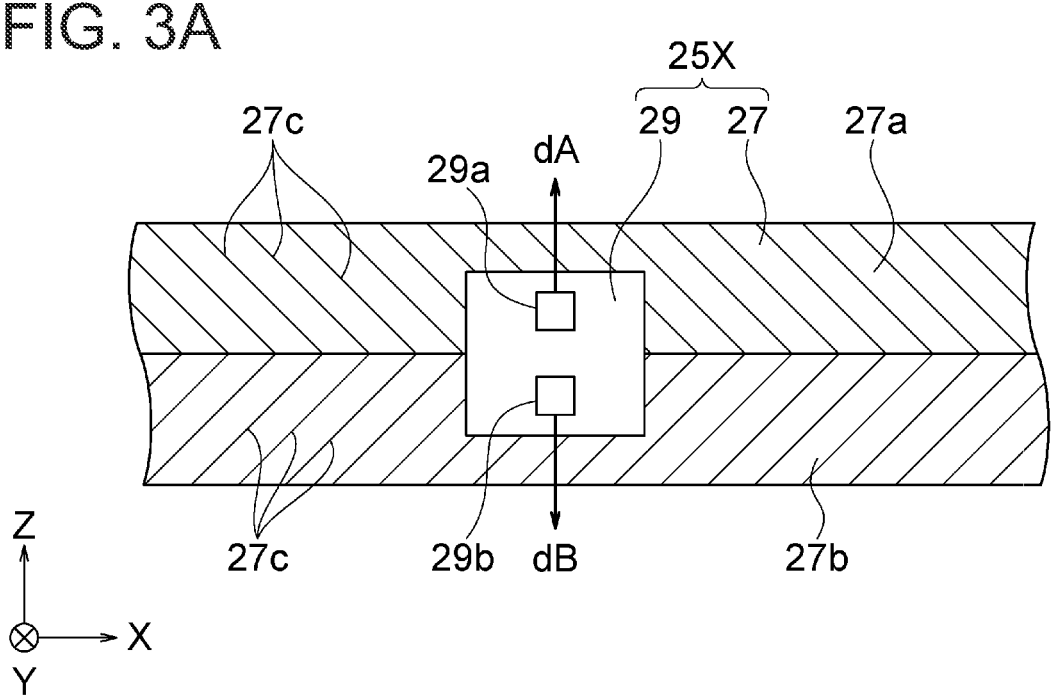
FIG. 3A and FIG. 3B are drawings explaining the configuration and operation of the X-axis sensor of the processing machine in FIG. 1.

FIG. 3A is an expanded view of a portion of the X-axis sensor 25X. Note that for convenience of explanation, the orientations of the scale part 27 and the detection unit 29 in the X-, Y-, and Z-directions of the orthogonal coordinate system in FIG. 3A differ from those in the other drawings, but there is no substantial difference.

The scale part 27 comprises, for example, an A-phase scale part 27a and a B-phase scale part 27b which extend in the X-direction in parallel to each other. The A-phase scale part 27a and the B-phase scale part 27b both comprise pluralities of patterns 27c formed optically or magnetically. The pluralities of patterns 27c have line shapes inclining in the X-direction. The magnitude of the angle of incline of the plurality of patterns 27c in the A-phase scale part 27a and the magnitude of those in the B-phase scale part 27b are equivalent to each other, but the inclining directions are reverse. The detection unit 29, for example, comprises an A-phase detection unit 29a for detecting the patterns 27c of the A-phase scale part 27a and a B-phase detection unit 29b for detecting the patterns 27c of the B-phase scale part 27b.

Figure 3B:
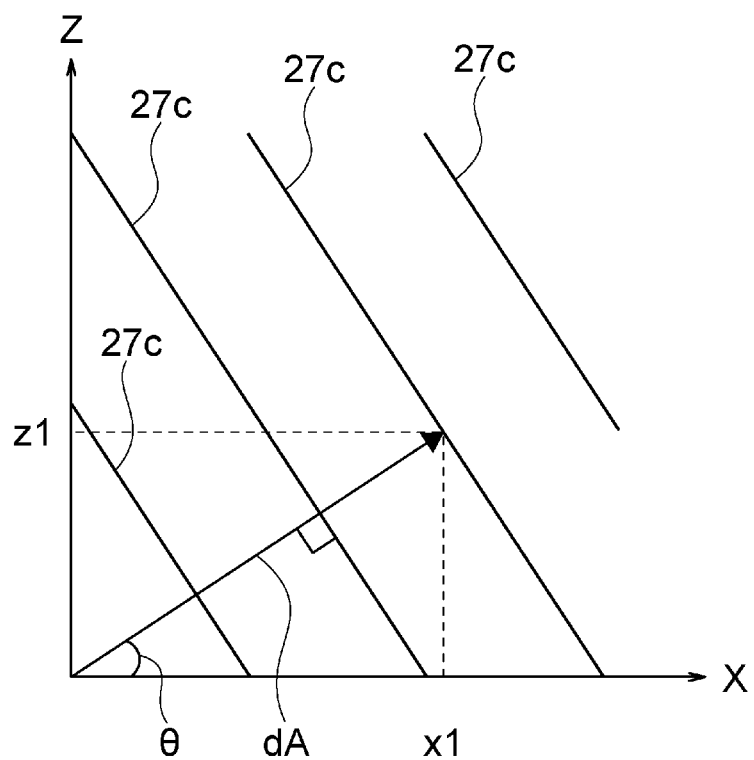

FIG. 3B is a schematic view showing an expanded portion of the A-phase scale part 27a.

Displacement dA in a direction orthogonal to the patterns 27c of the A-phase scale part 27a is detected from the counted number of patterns 27c detected by the A-phase detection unit 29a. The angle of incline of the direction orthogonal to the patterns 27c to the X-axis is θ, the X-direction component of displacement dA is x1, and the Z-direction component of displacement dA is z1. Under these conditions, the following equation stands:

$$dA = x1 \times \cos\theta + z1 \times \sin\theta \tag{1}$$

On the other hand, displacement dB (FIG. 3A) in a direction orthogonal to the patterns 27c of the B-phase scale part 27b is detected from the counted number of patterns 27c detected by the B-phase detection unit 29b. At this time, the angles of incline of the patterns 27c are the same between the A-phase scale part 27a and the B-phase scale part 27b, so in the B-phase scale part 27b as well, the angle of incline (absolute value) of the direction orthogonal to the patterns 27c to the X-axis is θ. Further, assuming that the detection unit 29 does not rotate about the Y-axis, the X-direction component and Z-direction component of displacement dB are the same as the X-direction component and Z-direction component of displacement dA (x1 and z1). Accordingly, the following equation stands:

$$dB = x1 \times \cos\theta - z1 \times \sin\theta \quad (1)$$

The following equations are derived from equation (1) and equation (2):

$$x1 = (dA + dB)/(2 \times \cos\theta) \quad (3)$$

$$z1 = (dA - dB)/(2 \times \sin\theta) \quad (4)$$

According to this principle, the two-dimensional scale in the illustrated example can detect displacement in two directions.

Figure 4:
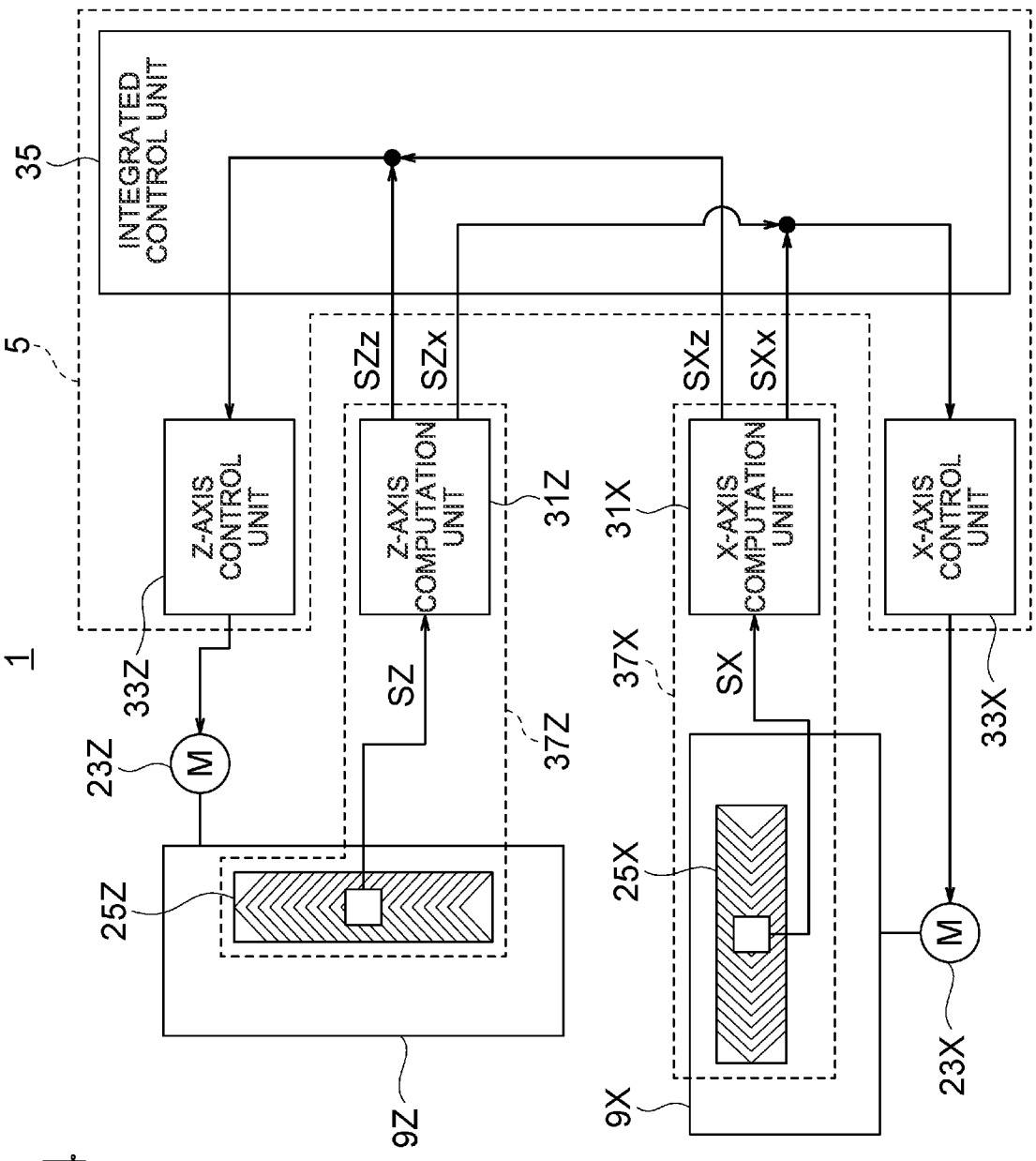
FIG. 4 is a block diagram showing the configuration of the control system of the processing machine in FIG. 1.

Although an X-axis sensor 25X was described, X and Z may be interchanged in the explanation relating to the above two-dimensional scale for application to a Z-axis sensor 25Z (FIG. 4). Further, the configuration of the two-dimensional scale explained with reference to FIG. 3A and FIG. 3B is merely one example of the configuration for the X-axis sensor 25X or Z-axis sensor 25Z. However, for convenience, the following explanation will at times assume the above configuration for the two-dimensional scale.

(Configuration of Control System of Processing Machine)

FIG. 4 is a block diagram showing the configuration of the control system of the processing machine 1. In more detail, here, in the configuration of the control system of the processing machine 1, the configuration for control of the position of the X-axis table 9X and the position of the Z-axis table 9Z is extracted.

The X-axis sensor 25X, for example, inputs the detection signal SX into an X-axis computation unit 31X. The detection signal SX, for example, is a pulse signal in which one pattern 27c passing directly below the detection unit 29 corresponds to one waveform (pulse wave). The pulse wave, for example, is a sine wave, a square wave, a triangular wave, or a sawtooth wave. The detection signal SX includes a pulse signal generated by the A-phase detection unit 29a and a pulse signal generated by the B-phase detection unit 29b.

The X-axis computation unit 31X counts the number of detected patterns 27c based on the input detection signal SX and performs the computations in equation (3) and equation (4) and so on. This determines the position of the X-axis table 9X in the X-direction and the position of the X-axis table 9X in the Z-direction. In addition, the X-axis computation unit 31X outputs a signal SXx including information about the position of the former and a signal SXz including information about the position of the latter.

The signal SXx including information about the position of the X-axis table 9X in the X-direction is input through an integrated control unit 35 of the control device 5 to an X-axis control unit 33X of the control device 5. The X-axis control unit 33X drives an X-axis drive source 23X based on information included in signal SXx and controls the position of the X-axis table 9X by feedback.

Through the above, control similar to general feedback control relating to the position of the X-axis table 9X in the X-direction is performed. Control similar to general feedback control is performed in a similar manner for the Z-axis table 9Z. X and Z (and x and z) may be interchanged in the above explanation for application to control relating to the position of the Z-axis table 9Z in the Z-direction.

The signal SXz including information about the position of the X-axis table 9X in the Z-direction generated at the X-axis computation unit 31X is input together with the signal SZz including information about the Z-axis table 9Z in the Z-direction generated at the Z-axis computation unit 31Z into a Z-axis control unit 33Z. In addition, in feedback control based on information included in the signal SZz, the Z-axis control unit 33Z performs control that reflects the information included in signal SXz. That is, as is already described, to cancel the influence of the error in the position of the X-axis table 9X in the Z-direction on the processing precision, the movement amount of the Z-axis table 9Z is increased or reduced by a movement amount corresponding to the magnitude of the error.

The influence of the error in the position of the Z-axis table 9Z in the X-direction on the processing precision may be reduced in a similar manner to the above. Specifically, the signal SZx including information about the position of the Z-axis table 9Z in the X-direction generated at the Z-axis computation unit 31Z is input together with the signal SXx including information about the X-axis table 9X in the X-direction generated at the X-axis computation unit 31X into the X-axis control unit 33X. Further, in feedback control based on the information included in the signal SXx, the X-axis control unit 33X performs control reflecting the information included in the signal SZx.

In the X-axis control unit 33X, acquisition of positions based on the signals SXx and SZx and control of the X-axis drive source 23X based on the acquired positions is performed repeatedly at predetermined control cycles. Similarly, in the Z-axis control unit 33Z, acquisition of positions based on the signals SZz and SXz and control of the Z-axis drive source 23Z based on the acquired signals is performed repeatedly at predetermined control cycles. The control cycle for the X-axis control unit 33X and the control cycle for the Z-axis control unit 33Z, for example, are identical (it is also possible that these be made different) and synchronized by the integrated control unit 35.

The integrated control unit 35, for example, acquires the signal SXx from the X-axis computation unit 31X at predetermined sampling cycles. Similarly, the integrated control unit 35, for example, acquires the signal SZz from the Z-axis computation unit 31Z at predetermined sampling cycles. The integrated control unit 35, for example, acquires the signal SXz from the X-axis computation unit 31X at predetermined sampling cycles. The integrated control unit 35, for example, acquires the signal SZx from the Z-axis computation unit 31Z at predetermined sampling cycles. The signals SXx, SZz, SXz, and SZx include information about the movement amount or position in each sampling cycle.

The sampling cycles for the signal SXx including information about the position of the X-axis table 9X in the X-direction and SZz including information about the position of the Z-axis table 9Z in the Z-direction are, for example, equivalent to the control cycles for the X-axis control unit 33X and Z-axis control unit 33Z or shorter than the control cycles. This allows the up-close detection value of the position used in feedback control to be updated in each control cycle.

The sampling cycles for the signal SXz including information about the position of the X-axis table 9X in the Z-direction and the signal SZx including information about the position of the Z-axis table 9Z in the X-direction, for example, may be shorter than the above control cycles, equivalent, or longer. As can be understood from the explanations for FIG. 6A and FIG. 6B, which will be described later, the up-close detection value of the error relating to straightness variance does not necessarily need to be updated each control cycle. However, for convenience, the following explanation will assume that the sampling cycles for the signals SXz and SZx are shorter than or equal to the control cycles.

The sampling cycles for the signals SXx and SZz, for example, may be the same (or may be different). The sampling cycles for the signal SXz may be the same as the sampling cycles for the signal SXx or SZz or may be different. Similarly, the sampling cycles for the signal SZx may be the same as the sampling cycles for the signal SZz or SXx or may be different. However, for convenience, the explanation will at times assume that the sampling cycles for the four signals SXx, SXz, SZz, and SZx are the same.

Note that "integrated control unit 35", "X-axis control unit 33X", and "Z-axis control unit 33Z" are functional or conceptual differentiations. Accordingly, from the viewpoint of hardware, these control units may be combined as a single unit or dispersed in a manner similar to the illustration or different from the illustration. Further, the X-axis control unit 33X and Z-axis control unit 33Z may be conceptualized as including drivers.

Generally, the term "sensor" is used to denote a transducer by itself for converting a physical amount to a signal or a device that includes a transducer and a functional unit connected to the transducer. The functional unit, for example, can be a driver for supplying power to the transducer or a computation unit for processing signals from the transducer. In the present embodiment, a combination of the X-axis sensor 25X and X-axis computation unit 31X may be conceptualized as the X-axis sensor 37X. Similarly, a combination of the Z-axis sensor 25Z and Z-axis computation unit 31Z can be conceptualized as the Z-axis sensor 37Z. From the viewpoint of hardware, the X-axis sensor 25X and X-axis computation unit 31X may be adjacent or not adjacent. This similarly applies to the Z-axis sensor 25Z and Z-axis computation unit 31Z.

(One Example of Configuration of Control System for Each Axis)

Figure 5:
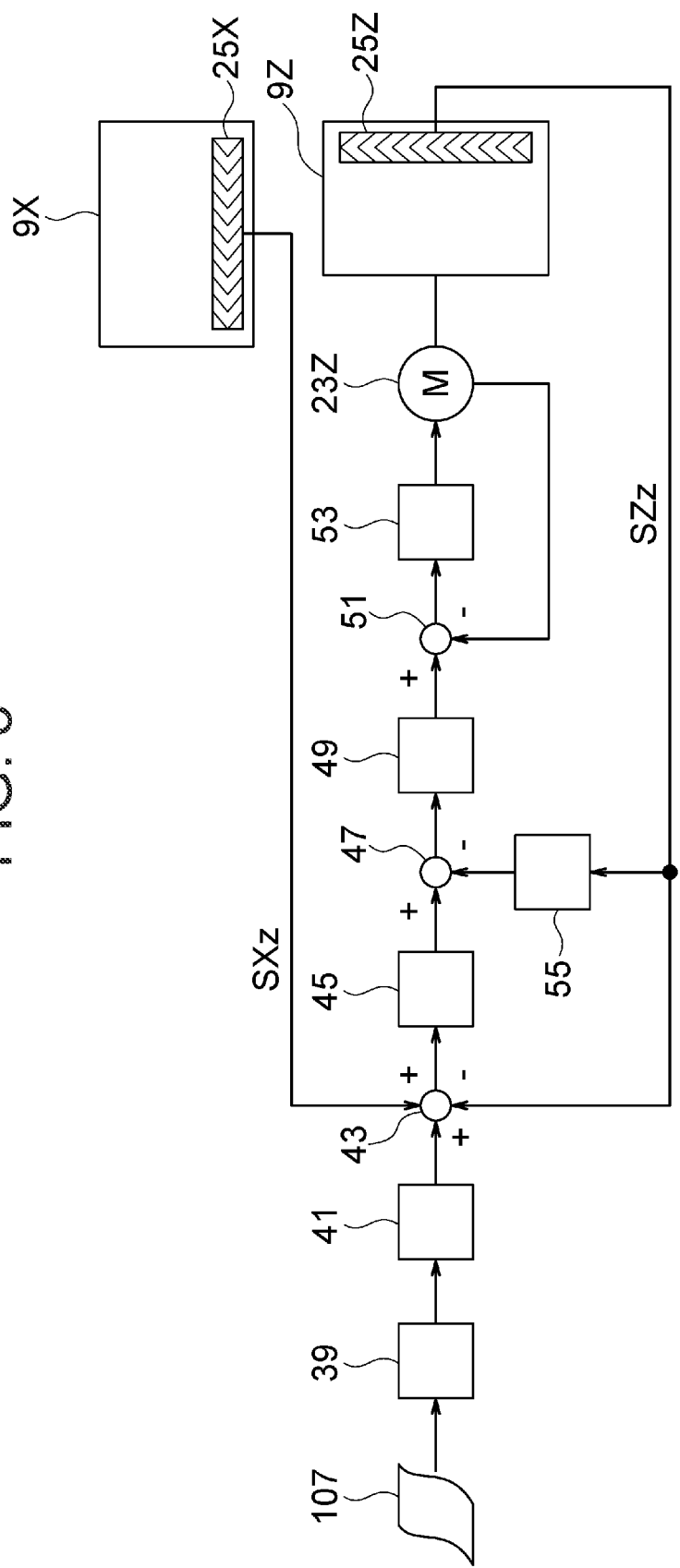
FIG. 5 is a drawing showing details of a portion of the block diagram in FIG. 4.

FIG. 5 is a block diagram showing one example of the configuration of the control system for each axis. Here, a configuration for controlling the position of the Z-axis table 9Z is used as an example.

An NC program 107 includes information about instructions relating to driving in each axis. For example, the NC program 107 includes information about instructions relating to movement of the X-axis table 9X, Z-axis table 9Z, and saddle 13. The information about instructions relating to movement, for example, includes information about a plurality of positions on a movement path and the speeds between the plurality of positions.

An interpretation unit 39 of the control device 5 reads and interprets the NC program 107. This, for example, allows information to be acquired respectively for the tables 9 and the saddle 13 about the plurality of positions being sequentially passed and the speeds between the plurality of positions.

The interpolation unit 41 of the control device 5 computes the target positions etc. for each predetermined control cycle based on the information acquired by the interpretation unit 39. For example, a plurality of target positions to be sequentially arrived at in each control cycle are set between each two sequentially passed positions based on the two positions and the speeds between the two positions. The interpolation unit 41 computes and outputs the target positions etc. for each control cycle for each axis. In FIG. 5, the target positions of the Z-axis table 9Z for each control cycle are output to an adder unit 43 of the control device 5.

In the adder unit 43, the deviations between the target positions for each control cycle and the positions of the Z-axis table 9Z in the Z-direction detected by the Z-axis sensor 25Z (signal SZz) are computed. Further, to cancel the influence of the error of the X-axis table 9X in the Z-direction on processing error, the error of the X-axis table 9X in the Z-direction detected by the X-axis sensor 25X is added or subtracted. In the example in FIG. 1, because the Z-axis table 9Z is moved to the same side as the side of the X-axis table 9X on which the error was produced (for example, the +Z side), the error is added to the deviations.

The rest is similar to the configuration of a general control system. For example, the deviations computed at the adder unit 43 (target movement amounts for each control cycle) are input to a position control unit 45 of the control device 5. The position control unit 45 multiplies the input deviations by a predetermined gain to compute the target speeds for each control cycle and outputs the target speeds to an adder unit 47 of the control device 5. The adder unit 47 computes the deviations between the input target speeds for each control cycle and detection speeds obtained by the detection positions of the Z-axis sensor 25Z being differentiated by a differentiation unit 55 of the control device 5 and outputs the deviations to a speed control unit 49 of the control device 5. The speed control unit 49 multiplies the input deviations by a predetermined gain to compute target currents (target torques) for each control cycle and outputs the target currents to an adder unit 51 of the control device 5. The adder unit 51 computes the deviations between the input target currents for each control cycle and the detection currents from a current detection unit which is not illustrated and outputs the deviations to a current control unit 53 of the control device 5. The current control unit 53 supplies power corresponding to the input deviations to the Z-axis drive source 23Z.

The above is only one example and may be suitably changed. For example, while not illustrated, feed-forward control may be added. Instead of a current loop, an acceleration loop may be inserted. If the drive source is a rotating electric motor and a rotation sensor for detecting its rotation (for example, an encoder or a resolver) is provided, speed control may be performed based on the detection values of the rotation sensor.

In the illustrated example, the error detected by the X-axis sensor 25X (detected error based on signal SXz) is input to the adder unit 43. Instead of being input to the adder unit 43, the error may be input to the interpolation unit 41 and used to compute the target positions for each control cycle. In either case, the deviations input to the position control unit 45 would be increased or reduced in comparison to when computed based solely on the differences between target positions based solely on the NC program 107 and detection positions based on signal SZz.

The configuration shown in FIG. 5 may be suitably applied to the configuration in FIG. 4. For example, the interpretation unit 39, interpolation unit 41, and adder unit 43 may be considered as being a part of the integrated control unit 35. The path from the position control unit 45 to the current control unit 53 may be considered as being a part of the Z-axis control unit 33Z.

Although control for movement of the Z-axis table 9Z was described, X and Z may be interchangeable in the above explanation for application to control for movement of the X-axis table 9X.

(Detection Value Used in Control)

The up-close detection value of the error relating to straightness variance used in control (detection value for the error input to the adder unit 43) may be the detection value held by the signal SXz or SZx as information (raw detection value) as is or may be a value obtained by some form of processing being performed on the raw detection value. An example is shown below. The following explanation will use a configuration that reduces the influence of the error relating to straightness variance of the X-axis table 9X on the processing precision by moving the Z-axis table 9Z, but it similarly applies to a configuration that reduces the influence of the error relating to straightness variance of the Z-axis table 9Z on the processing precision by moving the X-axis table 9X.

Figure 6A:
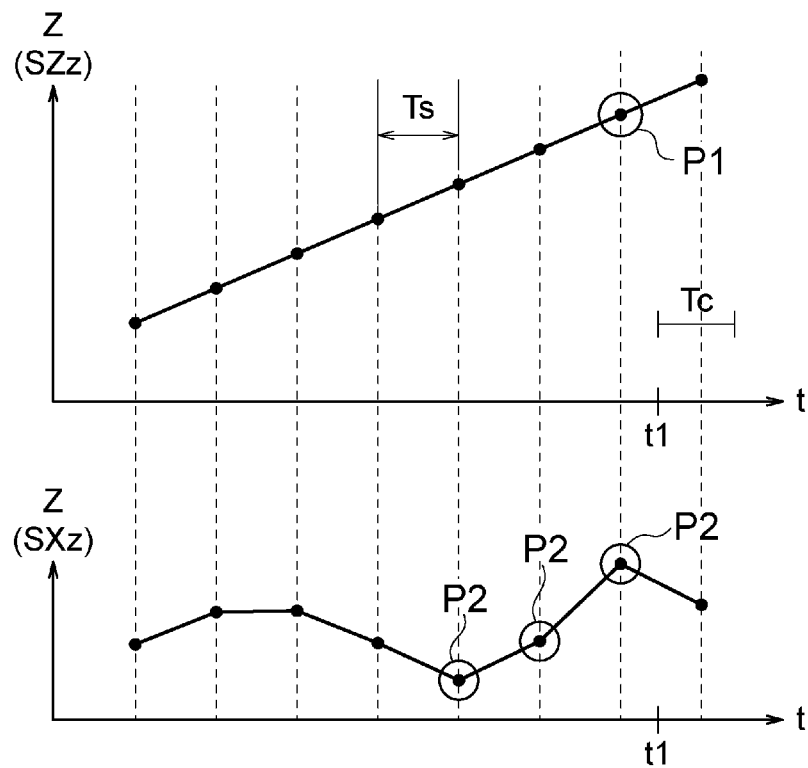
FIG. 6A and FIG. 6B are conceptual diagrams for explaining the detection values relating to straightness variance used in control.

FIG. 6A is a schematic view showing the change in the detection positions over time. In these drawings, the horizontal axis "t" represents the elapsed time. In the upper graph in FIG. 6A, the ordinate represents the positions of the Z-axis table 9Z in the Z-direction and, from another point of view, represents the raw detection values held by the signal SZz. In the lower graph in FIG. 6A, the ordinate represents the positions (errors) of the X-axis table 9X in the Z-direction and, from another point of view, represents the raw detection values held by the signal SXz.

The black dots plotted in the drawings represent raw detection values acquired for each sampling cycle Ts by the integrated control unit 35 from the Z-axis computation unit 31Z or X-axis computation unit 31X. In the example in FIG. 6A, the sampling cycle Ts is the same as the control cycle Tc in which feedback control is repeated by the Z-axis control unit 33Z. In other words, the integrated control unit 35 acquires signals SZz and SXz for each control cycle Tc from the Z-axis computation unit 31Z and X-axis computation unit 31X.

Note that a raw detection value is a detection value for each sampling cycle Ts. Accordingly, even for example, a value obtained by performing some kind of correction on the detection value held by the signal SZz or SXz (a narrow definition of the raw detection value) can be treated as a raw detection value as long as it is one that appears to be from each sampling cycle.

In the control loop explained with reference to FIG. 4 and FIG. 5, the detection value for the position of the Z-axis table 9Z in the Z-direction, for example, may be the up-close raw detection value among a plurality of raw detection values obtained as the results of control for each control cycle Tc up to the previous time. For example, as shown in the upper graph in FIG. 6A, if the present point in time is the time point t1, the detection value P1 immediately before it is input to the Z-axis control unit 33Z (adder unit 43). This, for example, reduces the delay in control of the actual position of the Z-axis table 9Z in the Z-direction and allows high precision positioning.

On the other hand, a detection value for the position (error) of the X-axis table 9X in the Z-direction, for example, may be the average value (moving average) of a predetermined number of raw detection values among a plurality of raw detection values obtained as the results of control for each control cycle Tc up to the previous time. For example, as shown in the lower graph in FIG. 6A, if the present point in time is the time point t1, the average value of a predetermined number (three in the illustrated example) of detection points P2 immediately before it is input to the Z-axis control unit 33Z (adder unit 43). This, for example, can reduce the likelihood of the Z-axis table 9Z moving due to an anomalous raw detection value. By extension, it can reduce the likelihood of the processing error increasing instead. However, like with the position of the Z-axis table 9Z in the Z-direction, it is permissible to use the up-close raw detection value of the error.

If the average value of a predetermined number of raw detection values is to be used as in the above, the predetermined number may be suitably set. For example, the predetermined number may be two, five or more, or 10 or more.

The predetermined number of raw detection values used in computing the average value, for example, may include the up-close (latest) raw detection value. Note that "up-close", for example, may be interpreted to mean within the range of being able to be integrated into the control loop. For example, if repetition of acquisition of raw detection values, repetition of computation of average value, and repetition of the control loop were being performed in parallel by multitasking, even if a new raw detection value is detected from computation of the average value until input of the result into the control loop, the raw detection value is not the up-close detection value. The newest one among the raw detection values that could be used for computation of the average value is treated as the up-close raw detection value. Note that this similarly may be applied to the use of "up-close" in other explanations regarding the detection value for normal feedback control (detection values held by signals SXx and SZz) etc.

The predetermined number of raw detection values used in computing the average value are consecutive raw detection values at the intervals of the sampling cycles Ts. That is, the predetermined number of raw detection values used in computing the average value are not screened. However, they may be screened. For example, anomalous detection values may be removed by filtering and the average value computed based on the remaining raw detection values. In this case, the adjustment may or may not be executed to make a number of remaining raw detection values become the predetermined number.

The "average value", unless otherwise noted, includes not only the arithmetic mean, but also the weighted average etc. For example, the weighted average may be computed so that the weighting is greater the closer in time a raw detection value is to the present point in time and used as the detection value input to the adder unit 43.

Figure 6B:
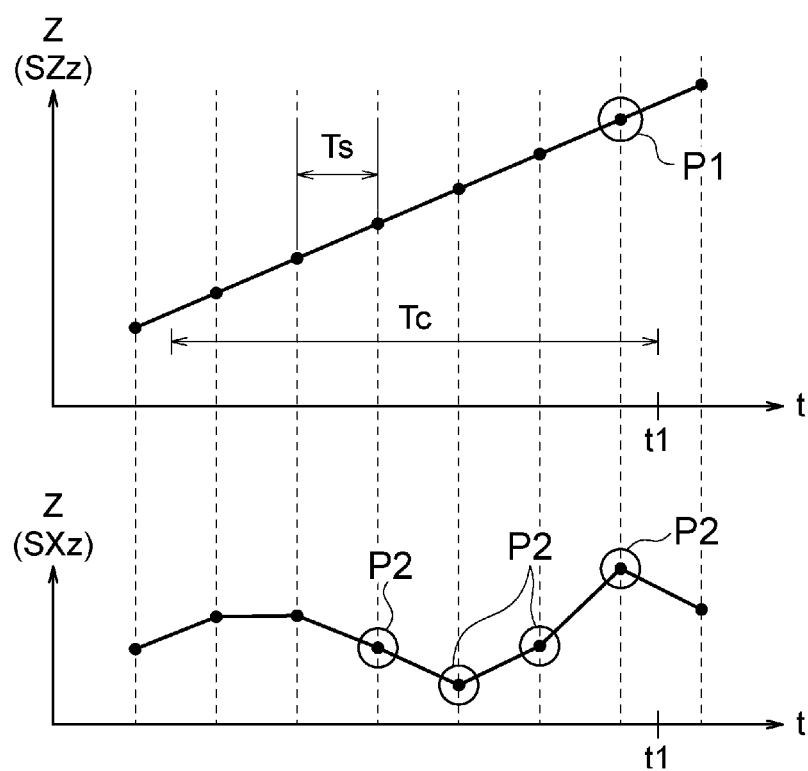

FIG. 6B is a drawing similar to FIG. 6A showing an example different from the example in FIG. 6A.

In the example in FIG. 6B, the sampling cycle Ts is less than half of the control cycle Tc in which feedback control is repeated. Accordingly, in the control cycle Tc, a plurality (six in the illustrated example) of raw detection values are acquired for the positions in the Z-direction.

The detection value for a position of the Z-axis table 9Z in the Z-direction, for example, may be the up-close raw detection value among a plurality of raw detection values within the control cycle Tc. For example, as shown in the upper graph in FIG. 6B, if the present point in time is the time point t1, the detection value P1 immediately before it may be input to the Z-axis control unit 33Z (adder unit 43). This, for example, reduces the delay in control of the actual position of the Z-axis table 9Z in the Z-direction and allows high precision positioning like in the example in FIG. 6A.

On the other hand, the detection value for a position (error) of the X-axis table 9X in the Z-direction, for example, may be the average value of a plurality of raw detection values in the control cycle Tc immediately before the present point in time. For example, as shown in the lower graph in FIG. 6B, if the present point in time is the time point t1, the average value of the plurality of detection values P2 immediately before it is input to the Z-axis control unit 33Z (adder unit 43). This, for example, can reduce the likelihood of the Z-axis table 9Z moving due to an anomalous raw detection value like in the example in FIG. 6A. However, similar to the position of the Z-axis table 9Z in the Z-direction, it is also possible to use only the up-close raw detection value to the error.

In the example in FIG. 6B, an average value is computed based on only a portion (four in the illustrated examples) of the plurality (six in the illustrated example) of raw detection values included in the up-close control cycle Tc. However, the average value may be computed based on all the raw detection values included in the up-close control cycle Tc. Further, as can be understood from the example in FIG. 6A, the average value may be computed based on the raw detection values not only in the up-close control cycle Tc but also in earlier control cycles Tc.

(Sampling Cycle)

As mentioned in the explanation for FIG. 4, the sampling cycle for acquiring the positions (error) of the X-axis table 9X in the Z-direction and the positions (error) of the Z-axis table 9Z in the X-direction may be suitably set. This sampling cycle may be set from the viewpoint of a match with the control cycle or may be set based on the magnitude of the targeted waviness etc. Below, an example in which the sampling cycle is set based on the magnitude of waviness, the processing conditions, and the number of raw detection values when calculating the average value is shown. The following explanation uses the sampling cycle of error for the X-axis table 9X as an example but it can similarly be applied to the sampling cycle of error for the Z-axis table 9Z.

For example, assume that the length in the X-direction (half wavelength) of one peak of waviness (error in the Z-direction) of the X-axis table 9X is 0.03 mm to 3 mm. Further, assume that the speed of the X-axis table 9X in the X-direction is 0.12 mm/min to 12 mm/min. At this time, the minimum time to pass one peak of waviness is as follows:

$$0.03/12 = 0.0025 \text{ min} = 0.15 \text{ sec}$$

Assume that to stably detect the height of one peak of waviness (error in the Z-direction), an average of 10 raw detection values (10-point average) is necessary for one peak. Further, for the above minimum time to pass the one peak, assume setting the sampling cycle so that 10 raw detection values can be acquired for one peak. The sampling cycle in this case is as follows.

$$0.15/10 = 0.015 \text{ sec}$$

The sampling cycle may be set in the above way. Note that from a different point of view, the processing machine 1 may be configured so that real-time processing in sampling cycles of less than or equal to the time set in the above manner is possible.

Here, a specific example of a sampling cycle and control cycle are shown. The sampling cycle and/or control cycle may be, for example, 0.02 sec or less, 0.01 sec or less, or 0.005 sec or less.

(Processing System)

Returning to FIG. 1, the processing machine 1 may be connected to a diagnostic device 93 using technology such as OpenCNC (computerized numerical control). From a different viewpoint, a processing system 91 can be configured by a processing machine 1 and diagnostic device 93.

The diagnostic device 93, for example, may be configured to include a computer (not illustrated). The computer, while not illustrated in particular, is configured to include a CPU, ROM, RAM, and external storage device. The CPU runs a program stored in the ROM and/or external storage device to construct various functional units.

The diagnostic device 93 (functional unit), for example, acquires information relating to processing from the control device 5 of the processing machine 1. The information, for example, can be information about the positions (error) of the X-axis table 9X in the Z-direction detected by the X-axis sensor 25X and/or information about the positions (error) of the Z-axis table 9Z in the X-direction detected by the Z-axis sensor 25Z. The information about the error may be the raw information described above or may be information subjected to some form of processing (for example, processing for the control described above). Further, the diagnostic device 93 performs processing based on the acquired information.

As the above processing based on acquired information, for example, display of an image based on the acquired information can be mentioned. For example, the diagnostic device 93 has a display device 93a. The display device 93a, for example, can display any image and is configured by a liquid crystal display or organic EL display. Furthermore, the diagnostic device 93 changes the image displayed by the display device 93a according to the acquired information.

As an example of an image displayed by the diagnostic device 93, for example, showing the error itself such as by a graph having an abscissa representing the positions of the X-axis table 9X in the X-direction and an ordinate representing the positions (error) of the X-axis table 9X in the Z-direction may be mentioned. A similar image may be displayed for the Z-axis table 9Z. Further, the image may be a predetermined warning image displayed when the acquired error (straightness variance) is large.

As the processing to be executed by the diagnostic device 93, besides the above, for example, processing for transmitting a control instruction to the control device 5 according to the error (straightness variance) may be mentioned. For example, the diagnostic device 93 may transmit a signal for stopping the processing cycle to the control device 5 when the error is large.

The diagnostic device 93 may adjoin the control device 5 and be connected by a cable or may be located away from the control device 5 (processing machine 1) and communicate with the control device 5 by wireless communication or wired communication. In the case of the latter, the control device 5 and diagnostic device 93 may be connected over the Internet and/or a telephone network. Note that if the diagnostic device 93 is adjacent to the control device 5, the diagnostic device 93 may be considered to be a part of the processing machine 1. Further, the diagnostic device 93 may be included in the control device 5.

As stated above, in the present embodiment, the processing machine 1 has a first moving part (X-axis table 9X), a first guide (X-axis guide 17X), a first drive source (X-axis drive source 23X), a first sensor (X-axis sensor 25X), a second moving part (Z-axis table 9Z), a second guide (Z-axis guide 17Z), a second drive source (Z-axis drive source 23Z), a second sensor (Z-axis sensor 25Z), and a control device 5. The X-axis table 9X supports the workpiece 103 or tool 101 (in the present embodiment, the tool 101). The X-axis guide 17X guides the X-axis table 9X in a first direction (X-direction). The X-axis drive source 23X drives the X-axis table 9X in the X-direction. The X-axis sensor 25X outputs a signal SX corresponding to a first displacement comprised of a displacement of the X-axis table 9X in the X-direction and a first error comprised of a displacement of the X-axis table 9X in a second direction (Z-direction) orthogonal to the X-direction. The Z-axis table 9Z supports the workpiece 103 or tool 101 (in the present embodiment, the workpiece 103). The Z-axis guide 17Z guides the Z-axis table 9Z in the Z-direction. The Z-axis drive source 23Z drives the Z-axis table 9Z in the Z-direction. The Z-axis sensor 25Z outputs a signal SZ corresponding to a second displacement comprised of a displacement of the Z-axis table 9Z in the Z-direction. The control device 5 controls the X-axis drive source 23X and Z-axis drive source 23Z according to a program (NC program 107) including information about an instruction relating to movement of the X-axis table 9X and the Z-axis table 9Z. The control device 5 has an interpolation unit 41, a first control unit (X-axis control unit 33X), and a second control unit (Z-axis control unit 33Z). The interpolation unit 41 computes a first target position of the X-axis table 9X in the X-direction for each predetermined control cycle Tc and a second target position of the Z-axis table 9Z in the Z-direction for each predetermined control cycle Tc based on the NC program 107. The X-axis control unit 33X, for each control cycle Tc, acquires an up-close detection value of the first displacement based on signal SX from the X-axis sensor 25X, computes a first deviation based on the difference between the acquired detection value and the first target position, and controls the X-axis drive source 23X so that the first deviation is reduced. The Z-axis control unit 33Z, for each control cycle Tc, acquires an up-close detection value of the second displacement based on the signal SZ from the Z-axis sensor 25Z, computes a second deviation based on the difference between the acquired detection value and the second target position, and controls the Z-axis drive source 23Z so that the second deviation is reduced. Further, the Z-axis control unit 33Z, for each control cycle Tc, acquires an up-close detection value of the first error based on the signal SX from the X-axis sensor 25X and increases or reduces the second deviation based on the detection value for the first error so that at least a portion of an error in the relative position between the workpiece 103 and the tool 101 in the Z-direction originating from the first error is cancelled by movement of the Z-axis table 9Z in the Z-direction.

Accordingly, for example, the processing error originating from straightness variance can be reduced. Further, for example, because the error relating to straightness variance is acquired in real time, application to non-reproducible straightness variance or straightness variance with reproducibility that is limited to short durations is possible. As a result, high processing precision can be realized. For example, in a proof of concept by the inventor, waviness with a height of 25 nm or more in the relative movement between the tool 101 and the workpiece 103 could be reduced to waviness with a height of 5 nm or less. Further, movement for reducing the influence of straightness variance on processing error can be realized by movement of the Z-axis table 9Z for moving the workpiece 103 in the Z-direction according to the NC program 107. Accordingly, there is no need to provide tables unrelated to the NC program 107 (dedicated tables for reducing the influence of straightness variance). As a result, the configuration of the processing machine 1 can be simplified. From a different point of view, the technology of the present disclosure can be applied to an already installed processing machine 1 to reduce the influence of straightness variance on processing error. Note that the processing machine 1 is revolutionary in that it uses the detection values for two axes from the X-axis sensor 25X and the Z-axis sensor 25Z in driving of the Z-axis table 9Z in one axis. Further, from a different point of view, it is revolutionary in that it uses the detection values for the X-axis sensor 25X provided on the X-axis table 9X for one axis in two-axis driving of the X-axis table 9X and the Z-axis table 9Z.

The second sensor (Z-axis sensor 25Z) may output a signal corresponding to the second error comprised of the displacement of the second moving part (Z-axis table 9Z) in the first direction (X-direction). The first control unit (X-axis control unit 33X), for each control cycle Tc, may acquire an up-close detection value of the second error based on the signal SZ from the Z-axis sensor 25Z and increase or reduce the first deviation based on the detection value for the second error so that at least a portion of an error in the relative position between the workpiece 103 and the tool 101 in the X-direction originating from the second error is cancelled by movement of the first moving part (X-axis table 9X) in the X-direction.

In this case, for example, the above effects can be obtained not only for the straightness variance of the movement of the X-axis table 9X but also the straightness variance of movement of the Z-axis table 9Z. As a result, the processing precision improves in any direction in the XZ plane.

The first moving part (X-axis table 9X) may support one of the workpiece 103 and the tool 101 (in the present embodiment, the tool 101). The second moving part (Z-axis table 9Z) may support the other of the workpiece 103 and the tool 101 (in the present embodiment, the workpiece 103).

In this case, for example, it is easier to reduce the influence of straightness variance on the processing precision in comparison to a configuration in which one of the X-axis table 9X and the Z-axis table 9Z supports the other, and both tables support one of the workpiece 103 and the tool 101 (this configuration may also be included in the art of the present disclosure). For example, in a configuration in which the X-axis table 9X also functions as the Z-axis bed 19Z to support the Z-axis table 9Z (this configuration may also be included in the art of the present disclosure), if the X-axis table 9X inclines relative to the X-direction (rotates about the Y-axis) while generating error in the Z-direction, the direction that the Z-axis table 9Z is guided in by the Z-axis bed 19Z inclines relative to the Z-direction. As a result, even if the Z-axis table 9Z moves by a displacement of a magnitude equivalent to the magnitude of the error of the X-axis table 9X in the Z-direction, because the Z-direction in which the error is detected and the direction in which the Z-axis table 9Z moves are inclined with respect to each other, the error cannot be completely cancelled. However, in a configuration in which the X-axis table 9X holds the tool 101 and the Z-axis table 9Z holds the workpiece 103, the two tables can move independently of each other, so the above inconvenience will not occur.

The first sensor (X-axis sensor 25X) may be a two-dimensional scale.

In this case, for example, the structure is simpler compared to a configuration in which a sensor for detecting displacement of the X-axis table 9X in the X-direction and a sensor for detecting displacement (error) of the X-axis table 9X in the Z-direction are separately mounted and collectively used as the X-axis sensor 25X (this configuration may also be included in the art of the present disclosure).

The length of the range of the two-dimensional scale (X-axis sensor 25X) over which the position in the first direction (X-direction) can be detected may be made 10 times or more the length over which the position in the second direction (Z-direction) can be detected.

In this case, for example, it is possible to reduce the size of the X-axis sensor 25X while accurately detecting both the movement of the X-axis table 9X in the X-direction corresponding to the NC program 107 and the error relating to straightness variance which is fine compared to the distance for this movement. Making the X-axis sensor 25X smaller, for example, improves the degree of freedom in the mounting position of the X-axis sensor 25X inside the processing machine 1. This consequently, for example, makes it easier to place the X-axis sensor 25X while taking Abbe's principle into account and improve detection precision.

The control device 5 may have an integrated control unit 35. The integrated control unit 35 may acquire a raw detection value for the first error (position in the Z-direction) based on the signal Sx from the first sensor (X-axis sensor 25X) at predetermined sampling cycles Ts and compute the average value of a plurality of raw detection values for the first error. The second control unit (Z-axis control unit 33Z) may use the average value as the detection value (up-close detection value) for the first error.

In this case, for example, as is already described, the likelihood of the Z-axis table 9Z moving due to an anomalous raw detection value among the plurality of raw detection values for the position (error) of the X-axis table 9X in the Z-direction is reduced. By extension, the likelihood of the processing precision being reduced instead is reduced.

The first guide (X-axis guide 17X) may be a V-V rolling guide.

In this case, for example, it is easy to lower the straightness variance of the X-axis guide 17X. Further, because the friction resistance of the X-axis table 9X when being moved in the X-direction is small, it can be positioned in the X-direction with high precision. This configuration allows realization of high processing precision. As a result, the usefulness of the effect of reducing the influence of straightness variance of the X-axis table 9X on the processing precision by moving the Z-axis table 9Z is increased.

The first drive source (X-axis drive source 23X) and second drive source (Z-axis drive source 23Z) may both be linear motors.

In this case, for example, mechanical error originating from backlash etc. is reduced and high processing precision can be realized in comparison to a configuration in which the rotation of a rotating drive source is converted to translational motion and transmitted to the tables 9 (this configuration may also be included in the art of the present disclosure). As a result, the usefulness of the effect of reducing the influence of straightness variance of the X-axis table 9X on the processing precision by moving the Z-axis table 9Z is increased. Further, it is easier to move the Z-axis table 9Z at a degree equivalent to the magnitude of the error of the X-axis table 9X relating to fine straightness variance and improve the effect of reducing the influence of straightness variance of the X-axis table 9X on the processing precision.

The processing system 91 according to the present disclosure may comprise the above processing machine 1 and the diagnostic device 93. The diagnostic device 93 may acquire information about the detection values of the first error (positions of the X-axis table 9X in the Z-direction) from the processing machine 1 and display an image corresponding to the acquired information.

In this case, for example, the state of the guide surface of the X-axis guide 17X can be managed using information for control of the processing machine 1. In other words, it is not necessary to add a special measurement system for measuring the state of the guide surface of the X-axis guide 17X. Further, the state of the guide surface can be managed in real time during processing. As a result, this inexpensively reduces the likelihood of continuing processing in a state in which the guide surface is suffering from aging or is damaged (producing a defective part).

Further, the method for manufacturing a processed object according to the present disclosure comprises a step of using the processing machine 1 to place the workpiece 103 and the tool 101 in contact with each other to process the workpiece 103 into a processed object.

In this case, for example, a processed object with high shape precision can be acquired through the above effect of reducing the influence of straightness variance on the processing precision.

(Variations)

Below, variations of the embodiment will be explained. In the following explanation, generally, only portions substantially different from the embodiment will be described. Matters not particularly mentioned may be considered to be similar to the embodiment or inferable from the embodiment. For convenience, the symbols of the embodiment have been added to elements corresponding to the elements of the embodiment in the following explanation even if different from the embodiment.

(Variation Relating to Targeted Axis)

Figure 7:
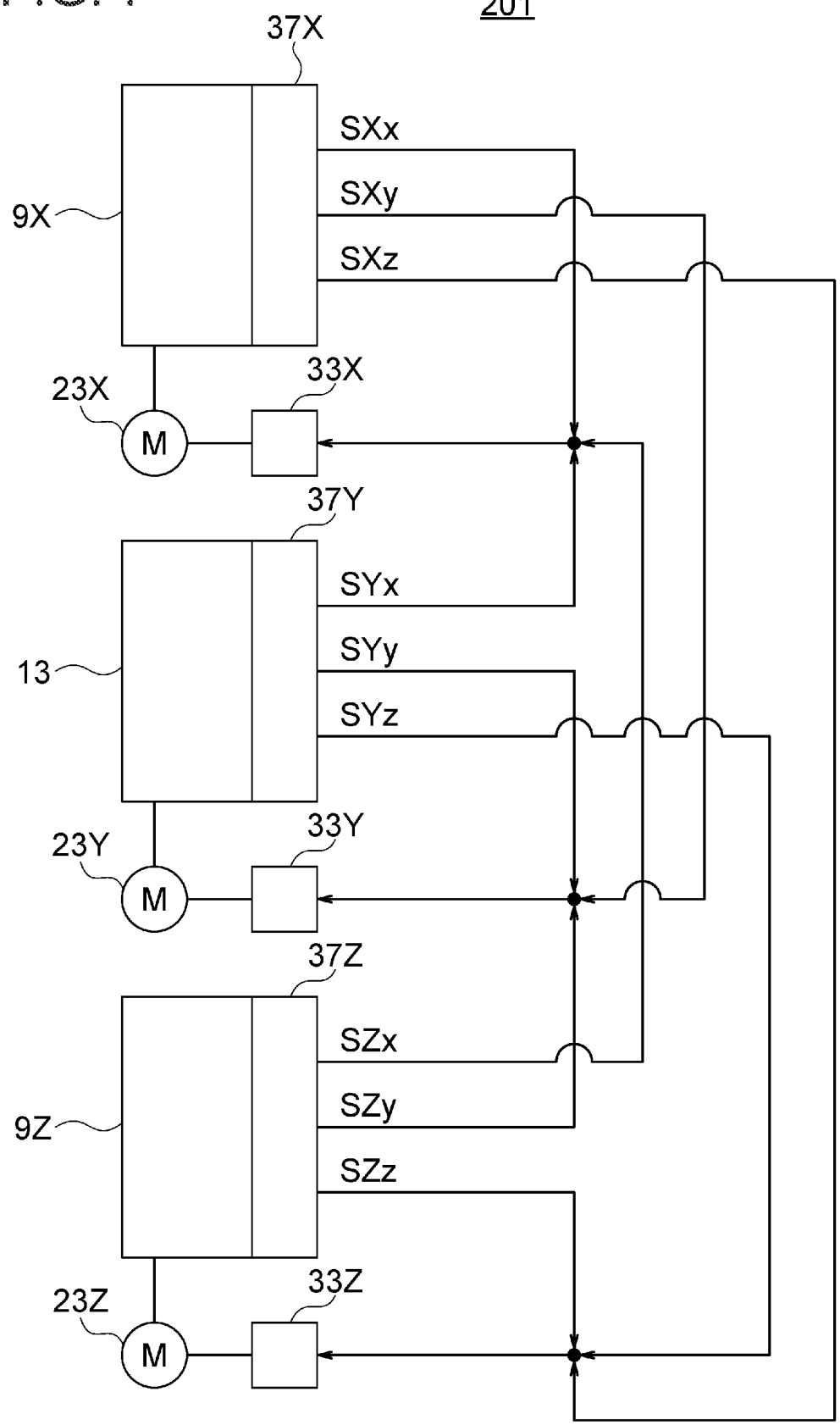
FIG. 7 is a block diagram of the control system of a processing machine according to a variation.

FIG. 7 is a block diagram of the control system of a processing machine 201 according to a modification. This drawing corresponds to a further simplified version of FIG. 4.

As described in the explanation about the embodiment, the method for reducing the influence of straightness variance on processing error may be applied to the straightness variance in any direction of any of the plurality of axes for translational movement. FIG. 7 illustrates an example of a configuration in which the method for reducing processing error is applied to the straightness variances of all directions of all the axes. This is specifically as follows.

The X-axis sensor 37X (including the X-axis sensor 25X and X-axis computation unit 31X) for detecting the position of the X-axis table 9X outputs, in addition to the signals SXx and SXz explained up to now, the signal SXy including information about a detection value of the position of the X-axis table 9X in the Y-direction. That is, the X-axis sensor 37X can detect the positions in all three axes.

This X-axis sensor 37X for detecting positions in three axes may be suitably realized. For example, in addition to the already described X-axis sensor 25X, a two-dimensional scale comprising a configuration like that of the X-axis sensor 25X can be provided in an orientation for detecting the position in the X-direction and the position in the Y-direction. Further, for example, in addition to the X-axis sensor 25X, a sensor for detecting only the position in the Y-direction may be provided. Moreover, instead of the X-axis sensor 25X (two-dimensional scale), a three-dimensional scale may be provided. The three-dimensional scale, for example, may be made one which determines the distance between the scale part 27 and detection unit 29 based on the strength of a signal SX generated according to the patterns 27c in a configuration like or similar to the two-dimensional scale.

Further, in addition to the control of the position of the Z-axis table 9Z in the Z-direction based on the detection position (detection error) of the X-axis table 9X in the Z-direction held in the signal SXz, similar to the above control, the position of the saddle 13 in the Y-direction may be controlled based on the detection position (detection error) of the X-axis table 9X in the Y-direction held in the signal SXy. Specifically, the information of the signal SXy is input to the Y-axis control unit 33Y. The Y-axis control unit 33Y controls a Y-axis drive source 23Y for driving the saddle 13 based on the detection error in the Y-direction so that at least a portion of the error in the relative position between the workpiece 103 and the tool 101 originating from the error in the Y-direction is cancelled by movement of the saddle 13 in the Y-direction.

Note that when canceling the influence of the error of the X-axis table 9X in the Z-direction, the error in the Z-direction is added to the deviation in the position control loop of the Z-axis table 9Z. On the other hand, the saddle 13 is supported on the X-axis table 9X unlike the Z-axis table 9Z. Accordingly, when canceling the influence of the error of the X-axis table 9X in the Y-direction, in the reverse to the above, the error in the Y-direction is subtracted from the deviation in the position control loop of the saddle 13. However, this explanation is a conceptual one in the case where the signs for the XYZ coordinates of the orthogonal coordinate system shown in FIG. 1 are applied as is in the control. Accordingly, for example, addition and subtraction may be the reverse of that from the above explanation in actual computation in the control unit.

In the same way as control relating to the straightness variance of the X-axis table 9X, the straightness variance of the Z-axis table 9Z and the straightness variance of the saddle 13 may be controlled.

Specifically, the Y-axis sensor 37Y outputs the signal SYx including information about the detection positions (detection error) of the saddle 13 in the X-direction, the signal SYy including information about the detection positions of the saddle 13 in the Y-direction, and the signal SYz including information about the detection positions (detection error) of the saddle 13 in the Z-direction. The signal SYy is used in position control of the saddle 13 in the Y-direction according to the NC program 107. The signal SYx is used in position control of the X-axis table 9X in the X-direction for reducing the influence of the error of the saddle 13 in the X-direction on the processing precision. The signal SYz is used in position control of the Z-axis table 9Z in the Z-direction for reducing the influence of the error of the saddle 13 in the Z-direction on the processing precision.

The Z-axis sensor 37Z, in addition to the already described signals SZx and SZz, outputs the signal SZy including information about the detection positions (detection error) of the Z-axis table 9Z in the Y-direction. The signal SZy is used in position control of the saddle 13 in the Y-direction for reducing the influence of the error of the Z-axis table 9Z in the Y-direction on the processing precision.

In addition, although not illustrated in particular, the method for reducing the influence of straightness variance on the processing precision, for example, may be applied solely to the straightness variance of one axis in one direction (for example, the error of the X-axis table 9X in the Z-direction). Further, for example, the method may be applied solely to the straightness variance of one axis in two directions (for example, the error of the X-axis table 9X in the Z-direction and Y-direction). Further, for example, the method may be applied solely to the straightness variance of one axis in one direction and the straightness variance of another axis in the same direction as the one direction with regard to translational movement in a direction different from the one direction (for example, the error of the X-axis table 9X in the Y-direction and the error of the Z-axis table 9Z in the Y-direction).

(Other Example of Configuration of Two-Dimensional Scale)

Figure 8:
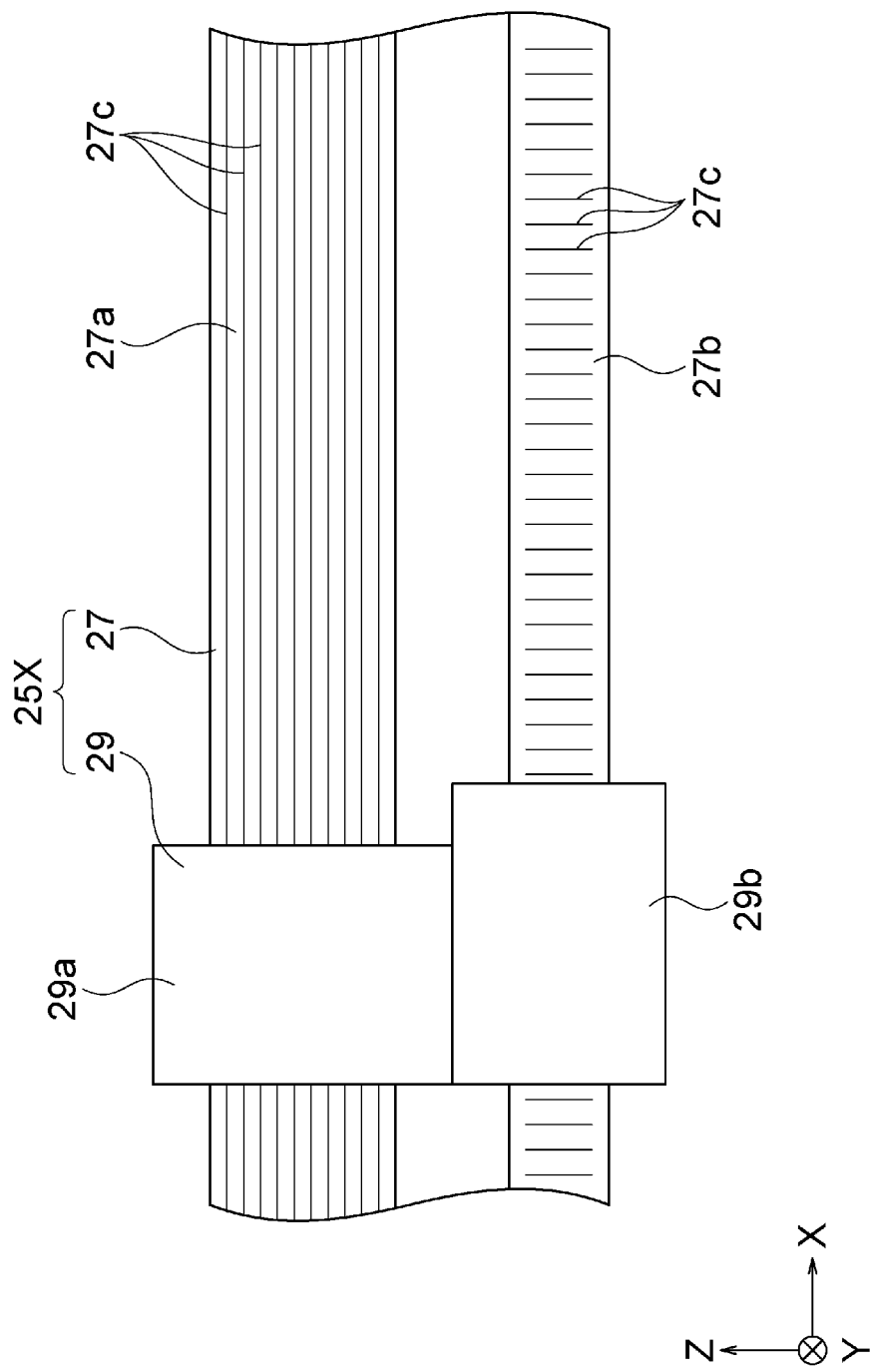
FIG. 8 is a drawing showing an example of the configuration relating to a two-dimensional scale different from the example of the configuration in FIG. 3A.

FIG. 8 is a drawing showing an example of the configuration relating to a two-dimensional scale different from the example of the configuration explained with reference to FIG. 3A. Here, the explanation uses the X-axis sensor 25X as an example for convenience.

The X-axis sensor 25X has a scale part 27 and detection unit 29 like the example of the configuration in FIG. 3A. The scale part 27 has an A-phase scale part 27a and B-phase scale part 27b which extend in the X-direction in parallel to each other. The detection unit 29 has an A-phase detection unit 29a for detecting the patterns 27c of the A-phase scale part 27a and a B-phase detection unit 29b for detecting the patterns 27c of the B-phase scale part 27b.

However, unlike the example of the configuration in FIG. 3A, a plurality of patterns 27c extending in the X-direction in parallel are arranged in the Z-direction in the A-phase scale part 27a. Accordingly, the A-phase detection unit 29a detects the position in the Z-direction. Further, a plurality of patterns 27c extending in the Z-direction in parallel are arranged in the X-direction in the B-phase scale part 27b. Accordingly, the B-phase detection unit 29b detects the position in the X-direction. By doing the above, the illustrated two-dimensional scale detects displacement in two directions.

In addition, although not illustrated in particular, the two-dimensional scale, for example, may detect two-dimensionally arranged bit patterns. Further, the two-dimensional scale may capture and acquire images of a scale part at a predetermined cycle and compute the movement amount in two directions based on a comparison between the previous image and the current image.

(Other Example of Configuration of Guide)

Figure 9:
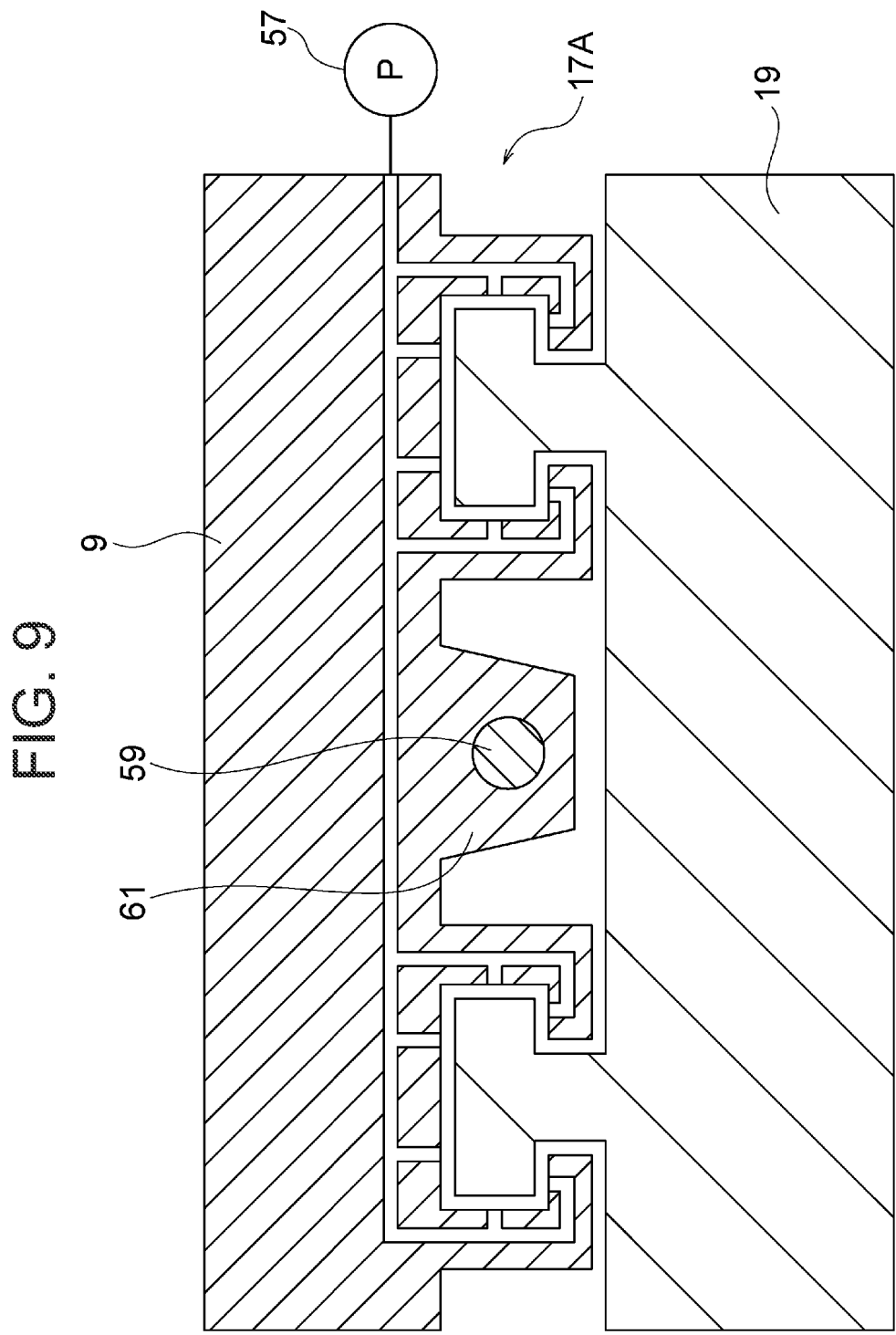
FIG. 9 is a drawing showing an example of the configuration relating to a guide different from the example of the configuration explained with reference to FIG. 2B.

FIG. 9 is a drawing showing an example of the configuration relating to a guide for guiding the tables 9 or saddle 13 different from the example of the configuration explained with reference to FIG. 2B. This drawing is a cross-sectional view corresponding to FIG. 2B. For convenience, the explanation uses a table 9 as an example of the members guided by the guide.

The guide 17A shown in FIG. 9 is configured by a so-called hydrostatic guide. Specifically, a gap is formed between the guided surface of the table 9 and guide surface of the bed 19. Fluid is supplied at a predetermined pressure to the gap using a pump 57 etc. The fluid may be a gas (for example, air) or a liquid (for example, oil).

If the guide 17A is configured by a hydrostatic guide in this manner, then, for example, since the friction resistance of the table 9 when moving in its movement direction according to the NC program 107 is low, it can be positioned in the movement direction with high precision. This configuration allows high processing precision to be realized. As a result, the usefulness of the effect of reducing the influence of straightness variance on the processing precision is increased.

(Other Example of Driving Mechanism)

FIG. 9 is also a view showing an example of a configuration for other than a linear motor as the configuration of the driving mechanism. Specifically, in FIG. 9, a threaded shaft 59 and a nut 61 screwably engaged with the threaded shaft 59 are illustrated. That is, a screw mechanism (for example, a ball screw mechanism or slide screw mechanism) are illustrated. When one of the threaded shaft 59 and the nut 61 (in the illustrated example, the nut 61) is placed in a state in which rotation is restricted and the other of the threaded shaft 59 and the nut 61 (in the illustrated example, the threaded shaft 59) is rotated, the two move relative to each other in the axial direction. One of the threaded shaft 59 and the nut 61 (in the illustrated example, the threaded shaft 59) is supported on the bed 19, and the other of the threaded shaft 59 and the nut 61 (in the illustrated example, the nut 61) is supported on the table 9. The driving force for rotating the threaded shaft 59 (or nut 61) is generated by, for example, a rotating electric motor (not illustrated).

(Example of Configuration of Bearing of Spindle)

FIG. 10 is a cross-sectional view showing one example of the configuration of the bearing of the spindle 15.

As described in the explanations about the embodiment, the bearing of each spindle 15 can be a slide bearing, a rolling bearing, a hydrostatic bearing, or a combination of two or more of these. In FIG. 10, a hydrostatic bearing is provided as an example. Specifically, a gap is formed between the outer peripheral surface of the spindle body 15a (the spindle body 15a may be called the "spindle") for holding the tool 101 or workpiece 103 and rotating about an axis and the inner peripheral surface of a bearing member 15b (hydrostatic bearing) surrounding the spindle body 15a around its axis. Fluid is supplied at a predetermined pressure to the gap by a pump 57 etc. The fluid may be a gas (for example, air) or a liquid (for example, oil).

When the spindle body 15a is supported by a hydrostatic bearing in this manner, for example, since the friction resistance of the spindle body 15a when rotating about its axis according to the NC program 107 is low, the rotational speed of the spindle body 15a can be controlled with high precision, and, by extension, high processing precision can be realized. As a result, the usefulness of the effect of reducing the influence of straightness variance on the processing precision can be increased.

Note that, in the above embodiment and variations, the X-direction is one example of the first direction. The X-axis table 9X is one example of the first moving part. The X-axis guide 17X is one example of the first guide. The X-axis drive source 23X is one example of the first drive source. The X-axis sensor 25X is one example of the first sensor. The X-axis control unit 33X is one example of the first control unit. The Z-direction is one example of the second direction. The Z-axis table 9Z is one example of the second moving part. The Z-axis guide 17Z is one example of the second guide. The Z-axis drive source 23Z is one example of the second drive source. The Z-axis sensor 25Z is one example of the second sensor. The Z-axis control unit 33Z is one example of the second control unit.

The art of the present disclosure is not limited to the above embodiment and variations and may be implemented in various configurations.

As described in the explanations about the embodiment, the processing machine is not limited to the configuration illustrated in FIG. 1. For example, the processing machine is not limited to special machine tools such as ultra-precise aspheric surface processing machines and may be a common machine tool. Further, the processing machine is not limited to machine tools and may be, for example, a robot. From another point of view, the program including information about an instruction relating to movement is not limited to NC programs and may be a program generated by teaching.

Further, the processing machine is not limited to one that grinds and/or polishes but may be one that, for example, cuts or performs electrodischarge machining or one that performs a combination of the above two various processes or more.

The processing may be processing by contact of a non-rotating tool against a rotating workpiece (for example, turning), processing by contact of a rotating tool against a non-rotating workpiece (for example, milling), or processing in which neither the workpiece nor the tool rotate.

The processing machine has at least two orthogonal axes as axes by which the workpiece and/or tool are moved translationally. Accordingly, the processing machine, for example, need not have three axes for translational movement or may conversely have four or more axes.

REFERENCE SIGNS LIST

1: processing machine; 5: control device; 9X: X-axis table (first moving part); 9Z: Z-axis table (second moving part); 17X: X-axis guide (first guide); 17Z: Z-axis guide (second guide); 23X: X-axis drive source (first drive source); 23Z: Z-axis drive source (second drive source); 25X: X-axis sensor (first sensor); 25Z: Z-axis sensor (second sensor); 33X: X-axis control unit (first control unit); 33Z: Z-axis control unit (second control unit); 41: interpolation unit, 101: tool; 103: workpiece; 107: NC program (program)

The invention claimed is:

1. A processing machine comprising:
   a first moving part configured to support a first one of a workpiece and a tool via a third moving part;
   a first guide configured to guide the first moving part in a first direction with respect to a base;
   a first drive source configured to drive the first moving part in the first direction with respect to the base;
   a first sensor configured to output a signal corresponding to a first displacement comprising a displacement of the first moving part in the first direction with respect to the base and a first error comprising a displacement of the first moving part in a second direction orthogonal to the first direction with respect to the base;
   a second moving part configured to support a second one of the workpiece and the tool;
   a second guide configured to guide the second moving part in the second direction with respect to the base;
   a second drive source configured to drive the second moving part in the second direction with respect to the base;
   a second sensor configured to output a signal corresponding to a second displacement comprising a displacement of the second moving part in the second direction with respect to the base;
   a third guide configured to guide the third moving part in a third direction orthogonal to both the first and second directions with respect to the first moving part;
   a third drive source configured to drive the third moving part in the third direction with respect to the first moving part; and
   a control device comprising a processor and a non-transitory memory, the control device configured to control the first drive source, the second drive source, and the third drive source according to a program which includes information about instructions relating to movement of the first moving part, the second moving part and the third drive source, wherein
   the non-transitory memory comprises instructions that, when executed by the processor, cause the processor to perform processing providing:
   an interpolation unit configured to compute, based on the information of the program, a first target position for the first moving part in the first direction for each predetermined control cycle, a second target position for the second moving part in the second direction for each predetermined control cycle and a third target position for the third moving part in the third direction for each predetermined control cycle, a first control unit configured to acquire, in each control cycle, a detection value of the first displacement which is up-close based on the signal from the first sensor, compute a first deviation based on a difference between the detection value acquired and the first target position, and control the first drive source so that the first deviation is reduced, a second control unit configured to acquire, in each control cycle, a detection value of the second displacement which is up-close based on the signal from the second sensor, compute a second deviation based on a difference between the detection value acquired and the second target position, and control the second drive source so that the second deviation is reduced, and a third control unit configured to control, in each control cycle, the third drive source based on a detection position of the third moving part and the third target position, and the second control unit is configured to acquire, in each control cycle, a detection value of the first error which is up-close based on the signal from the first sensor, and increase or reduce the second deviation based on the detection value of the first error, without consideration of a detection value of a third error comprising a displacement of the third moving part in the second direction with respect to the first moving part which is up-close, so that at least a portion of an error in a relative position of the workpiece and the tool in the second direction originating from the first error is cancelled by movement of the second moving part in the second direction.

2. The processing machine according to claim 1, wherein the second sensor is configured to output a signal corresponding to a second error comprised of a displacement of the second moving part in the first direction, and the first control unit is configured to acquire, in each control cycle, a detection value of the second error which is up-close based on the signal from the second sensor and increase or reduce the first deviation based on the detection value of the second error so that at least a portion of an error in a relative position of the workpiece and the tool in the first direction originating from the second error is cancelled by movement of the first moving part in the first direction.

3. The processing machine according to claim 1, wherein the first moving part is configured to support one of the workpiece and the tool, and the second moving part is configured to support the other of the workpiece and the tool.

4. The processing machine according to claim 1, wherein the first sensor comprises a two-dimensional scale.

5. The processing machine according to claim 4, wherein a length of a range of the two-dimensional scale over which positions in the first direction can be detected is 10 times or more a length of a range over which positions in the second direction can be detected.

6. The processing machine according to claim 1, wherein the control device comprises an integrated control unit configured to acquire a raw detection value of the first error based on the signal from the first sensor at a predetermined sampling cycle and compute an average value of a plurality of the raw detection values of the first error, and the second control unit is configured to increase or reduce the second deviation using the average value as the detection value of the first error.

7. The processing machine according to claim 1, wherein the first guide comprises a hydrostatic guide or V-V rolling guide.

8. The processing machine according to claim 1, wherein the processing machine comprises a spindle configured to hold the workpiece or the tool and a hydrostatic bearing configured to support the spindle rotatably about an axis.

9. The processing machine according to claim 1, wherein each of the first drive source and the second drive source comprises a linear motor.

10. A processing system comprising the processing machine according to claim 1, and a diagnostic device configured to acquire information about the detection value of the first error from the processing machine and display an image corresponding to the information acquired.

11. A method of manufacturing a processed object, comprising using the processing machine according to claim 1 to place the workpiece and the tool in contact with each other to process the workpiece into the processed object.

* * * * *